US010001977B1

(12) United States Patent
Owen et al.

(10) Patent No.: US 10,001,977 B1
(45) Date of Patent: Jun. 19, 2018

(54) SYSTEM AND METHOD FOR IDENTIFYING OPERATIONS BASED ON SELECTED DATA

(75) Inventors: James Gareth Owen, Bolton, MA (US); Claudia Gaudagnini Wey, Wayland, MA (US)

(73) Assignee: The MathWorks, Inc., Natick, MA (US)

( * ) Notice: Subject to any disclaimer, the term of this patent is extended or adjusted under 35 U.S.C. 154(b) by 729 days.

(21) Appl. No.: 12/479,585

(22) Filed: Jun. 5, 2009

(51) Int. Cl.
*G06F 9/44* (2006.01)

(52) U.S. Cl.
CPC ..................... *G06F 8/34* (2013.01)

(58) Field of Classification Search
None
See application file for complete search history.

(56) References Cited

U.S. PATENT DOCUMENTS

| | | | | |
|---|---|---|---|---|
| 6,002,871 | A * | 12/1999 | Duggan et al. | 717/135 |
| 6,425,120 | B1 * | 7/2002 | Morganelli et al. | 717/109 |
| 6,598,224 | B1 * | 7/2003 | Maeda et al. | 717/174 |
| 6,640,234 | B1 * | 10/2003 | Coffen et al. | 715/219 |
| 6,697,088 | B1 * | 2/2004 | Hollander | 715/744 |
| 7,664,720 | B1 * | 2/2010 | Freeman | G06F 3/0481 706/13 |
| 7,882,438 | B2 * | 2/2011 | Markham et al. | 715/736 |
| 7,917,375 | B2 * | 3/2011 | Ohmura et al. | 705/2 |
| 8,225,152 | B2 * | 7/2012 | Sutton | 714/724 |
| 8,279,204 | B1 | 10/2012 | Owen et al. | |
| 2002/0036662 | A1 * | 3/2002 | Gauthier et al. | 345/835 |
| 2002/0091823 | A1 * | 7/2002 | Boyd et al. | 709/224 |
| 2002/0124241 | A1 * | 9/2002 | Grey et al. | 717/149 |
| 2003/0023951 | A1 * | 1/2003 | Rosenberg | G06F 17/10 717/104 |
| 2003/0058280 | A1 * | 3/2003 | Molinari et al. | 345/771 |
| 2003/0210275 | A1 * | 11/2003 | Draschwandtner | G06F 9/45512 715/810 |

(Continued)

OTHER PUBLICATIONS

John Walkenbach, Excel 2007 Bible, 2007, John Wiley & Sons, pp. 1-59.*

(Continued)

*Primary Examiner* — Henry Tsai
*Assistant Examiner* — Christopher Bartels
(74) *Attorney, Agent, or Firm* — Cesari and McKenna, LLP; Michael R. Reinemann

(57) ABSTRACT

A system and method identifies a set of operations or tasks, such as functions, of a programming system or technical computing environment based on a selection of input data. The technical computing environment may have a plurality of operations that may be called and executed. The operations may operate on one or more input arguments that may need to satisfy certain constraints. Upon selection of input data, a matching engine may classify the input data, and compare the classifications of the input data to the input argument constraints of a plurality of operations. The matching engine may identify those operations whose input argument constraints are satisfied by the selected input data, as well as those operations whose input argument constraints are not satisfied by the selected input data. The matching and non-matching operations may be provided to an action unit, which may be configured to perform some task or action with regard to some or all of the operations.

27 Claims, 20 Drawing Sheets

(56) References Cited

U.S. PATENT DOCUMENTS

| | | | | |
|---|---|---|---|---|
| 2003/0217354 | A1* | 11/2003 | Bates et al. | 717/129 |
| 2004/0002941 | A1* | 1/2004 | Thorne | G06F 17/30365 |
| 2004/0060001 | A1* | 3/2004 | Coffen et al. | 715/503 |
| 2004/0181294 | A1* | 9/2004 | Deitz et al. | 700/19 |
| 2004/0181748 | A1* | 9/2004 | Jamshidi et al. | 715/503 |
| 2004/0268300 | A1* | 12/2004 | Huin et al. | 717/107 |
| 2005/0010900 | A1* | 1/2005 | Huin et al. | 717/109 |
| 2005/0091369 | A1* | 4/2005 | Jones | 709/224 |
| 2006/0179121 | A1* | 8/2006 | Kegoya et al. | 709/217 |
| 2007/0039049 | A1* | 2/2007 | Kupferman et al. | 726/22 |
| 2009/0300542 | A1* | 12/2009 | Duarte et al. | 715/800 |
| 2010/0138778 | A1* | 6/2010 | Dewan et al. | 715/789 |
| 2010/0269061 | A1* | 10/2010 | Cantor et al. | 715/780 |
| 2012/0313953 | A1 | 12/2012 | Owen et al. | |

OTHER PUBLICATIONS

"MATLAB® 7 Programming," The MathWorks, Inc., Sep. 2007, pp. 1-887.
"Getting Started with MATLAB® 7," The MathWorks, Inc., Mar. 2007, pp. 1-230.
"MATLAB® 7 Desktop Tools and Development Environment," The MathWorks, Inc., Oct. 2008, pp. 1-855.
"Microsoft Windows Techniques," Susan Dorey Designs, Jan. 26, 2007, pp. 1-8.
"Microsoft Windows Explorer," Kuhn Consulting, 2001, pp. 1-9.

\* cited by examiner

SYSTEM AND METHOD FOR IDENTIFYING OPERATIONS BASED ON SELECTED DATA

BACKGROUND OF THE INVENTION

Copyright Notice

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND INFORMATION

Scientists, engineers and others often use programming or technical computing tools or environments to analyze systems or data, develop solutions and display or represent data. Such tools often include a library of functions that may be called and executed by the user. Exemplary technical computing systems include the MATLAB® and Simulink® software products from The MathWorks, Inc. of Natick, Mass.

A function typically operates on one or more input arguments and may produce an output argument or a plurality of output arguments. The input arguments for a given function often need to be in a particular form in order for the given function to execute without error. For example, one or more input arguments may need to be of a particular data type, such as numeric values, logical values, or character values. One or more input arguments may need to conform to a particular structure, such as a scalar, a vector, or a matrix. Another constraint on the input data may be the size or shape of the input data. For example, the input data may need to be two matrices of the same size. The input arguments also may need to represent a particular kind of data, such as image data, audio data, temperature or pressure data, etc. If the input data does not satisfy these various constraints, the function will not execute properly.

SUMMARY OF THE INVENTION

Briefly, the present invention relates to a system and method for identifying a set of operations or tasks, such as functions, of a programming or technical computing system based on a selection of input data. More specifically, the technical computing system may provide a user interface for calling or executing a plurality of operations, such as various signal processing functions, plotting functions, etc. These operations are defined to operate on one or more input arguments. Depending on the particular operation, moreover, the respective input arguments must satisfy certain constraints in order for that operation to execute without error. Upon selection of input data, e.g., through user selection, a matching engine may classify the input data, e.g., by size, dimension, format, type, etc., and compare the classifications of the input data to the input argument constraints of a plurality of operations. The matching engine may identify those operations whose input argument constraints are satisfied by the selected input data, as well as those operations whose input argument constraints are not satisfied by the selected input data. The two sets of operations, e.g., matching and non-matching, may be presented to an action unit, which may be configured to perform some task or action with some or all of the operations.

In an embodiment, a display generator may be configured to create a window that displays both the matching and the non-matching operations to the user of the technical computing system. The user may select one of the matching operations, such as with a mouse or other input device, and the action unit may respond by executing or evaluating the operation using the selected input data as its input arguments. The non-matching operations may be presented in a manner that prevents such operations from being selected for execution by the user, since any such execution would either fail or would generate one or more errors. Information, such as help information, however, may be presented for one or more of the non-matching operations. The help information may indicate or explain why the selected input data failed to satisfy the input argument constraints of the non-matching operation. For example, the help information may suggest what other or additional data should be selected in order for the operation to be executable.

In an embodiment, a programming code generator may be configured to generate programming code for both matching and non-matching operations. In particular, programming code for an operation whose input argument constraints are satisfied by the selected input data may be generated and placed in a programming window of the technical computing system. This programming code may be run or compiled. Programming code for an operation whose input argument constraints are not satisfied by the selected input data also may be generated and placed in the programming window. The user may modify this programming code, such as by designating or selecting other or additional input data to render the programming code executable.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
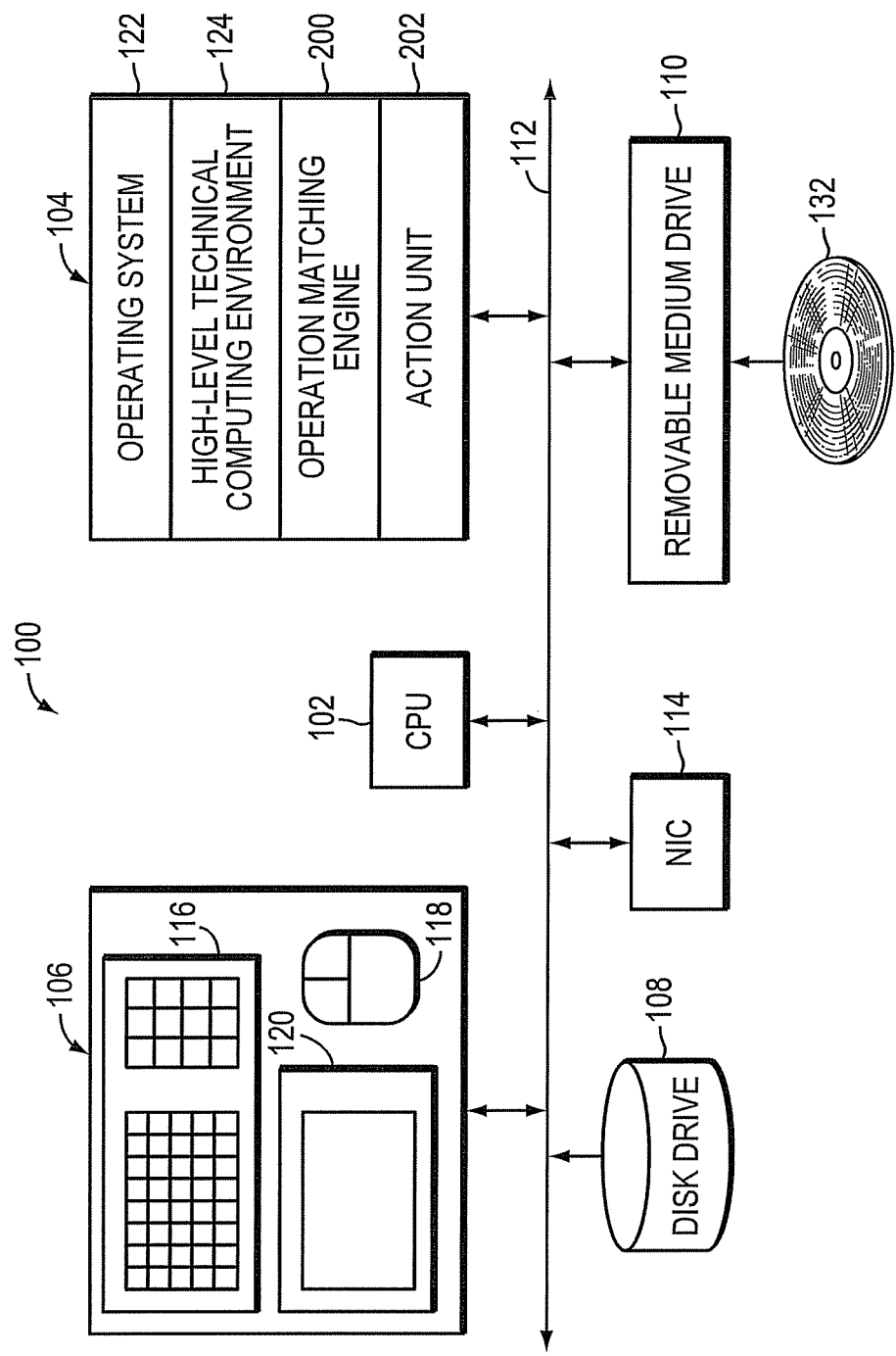
FIG. 1 is a schematic illustration of a data processing device for use with the present invention.

FIG. 1 is a schematic illustration of a data processing system 100 for implementing and utilizing an embodiment of the invention. The data processing system 100 includes a central processing unit (CPU) 102, a main memory 104, user input/output (I/O) 106, a disk drive 108, and a removable medium drive 110 that are interconnected by a system bus 112. The data processing system 100 may also include a network interface card (NIC) 114. The user I/O 106 may include a keyboard 116, a mouse 118 and a display 120.

The main memory 104 stores a plurality of libraries or modules, such as an operating system 122, and one or more applications running on top of the operating system 122, including a technical computing environment 124. The main memory 104 also may include an operation matching engine 200, and an action unit 202. The operation matching engine 200 and the action unit 202 may be configured as one or more toolboxes or add-on products to the high-level technical computing environment 124.

The removable medium drive 110 is configured to accept and read a computer readable medium 132, such as a CD, DVD, floppy disk, solid state drive, tape, flash memory or other medium. The removable medium drive 110 may further be configured write to the computer readable medium 130.

Suitable data processing systems include personal computers (PCs), workstations, laptops, palm computers and other portable computing devices, etc. Nonetheless, those skilled in the art will understand that the data processing system 100 of FIG. 1 is meant for illustrative purposes only and that the present invention may be used with other data processing systems, computers, or computational devices. The present invention may also be used in a networked, e.g., client-server, computer architecture. For example, the technical computing environment 124, operation matching engine 200 and action unit 202 may reside on a server and made accessible to one or more client devices.

Suitable processors may include single processor architectures, dual or quad core processor architectures, microprocessors, digital signal processors (DSPs), etc., or various combinations thereof.

Suitable operating systems 122 include the Windows series of operating systems from Microsoft Corp. of Redmond, Wash., the Linux operating system, the MAC OS® series of operating systems from Apple Inc. of Cupertino, Calif., and the UNIX® series of operating system, among others.

As indicated above, a user or developer, such as an engineer, scientist, programmer, etc., may utilize the keyboard 116, the mouse 118 and the computer 120 of the user I/O 106 to operate the high-level technical computing environment 124. In an embodiment, the user also may operate the operation matching engine 200 and the action unit 202.

Suitable high-level technical computing environments for use with embodiments of the present invention include the MATLAB® and SIMULINK® technical computing environments from The MathWorks, Inc. of Natick, Mass., the LabVIEW programming system from National Instruments Corp. of Austin, Tex., the Visual Engineering Environment (VEE) from Agilent Technologies, Inc. of Santa Clara, Calif., the Khoros development system from AccuSoft Corp. of Northborough, Mass., a C programming system, a JAVA programming system, and a C++ programming systems, among others.

Those skilled in the art will understand that the MATLAB® technical computing environment is a math-oriented, textual design and programming environment. The SIMULINK® technical computing environment is a graphical, block-based environment for modeling and simulating dynamic systems, among other uses.

Figure 2:
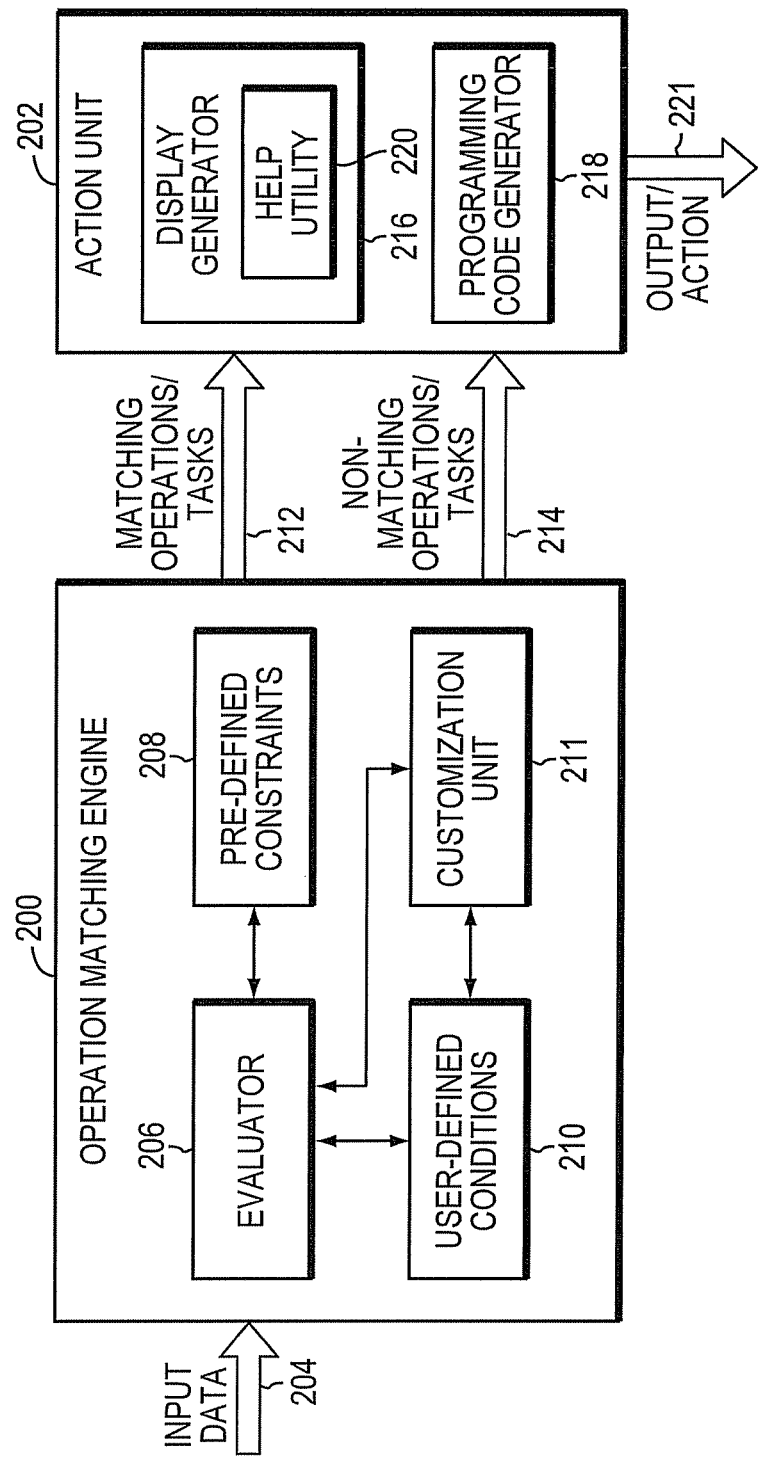
FIG. 2 is functional block diagram of a matching engine and an action unit in accordance with an embodiment of the present invention.

FIG. 2 is a functional block diagram of the operation matching engine 200 and the action unit 202. The operation matching engine 200 may receive input data as indicated by arrow 204. The term "input data" as used herein is intended to include data, parameters, arguments, variables, etc. The input data, moreover, may be selected by a user. It may be generated during execution of a program, script or function. It may be collected by a data acquisition device, or it may come from some other source. In an embodiment, the operation matching engine 200 may include one or more modules, such as an evaluator 206. The evaluator 206, moreover, may be coupled to, or have access to, a set of predefined constraints 208, and a set of user-defined conditions 210. The operation matching engine 200 may also include a customization unit 211 that may be coupled to the user-defined conditions 210 for defining or manipulating the user-defined conditions 210.

As described herein, the operation matching engine 200 typically identifies one or more matching operations and one or more non-matching operations based on the selected input data 204, as indicated by arrows 212 and 214, respectively. The identities of the matching and non-matching operations may be provided to the action unit 202. The action unit 202 may be configured to perform some action on or with the matching and non-matching operations, and may generate or implement one or more outputs or actions, as indicated by arrow 221, in response to the received matching and non-matching operations. In an embodiment, the action unit 202 may include a display generator 216 and a programming code generator 218. The display generator 216, moreover, may include a help utility 220.

It should be understood that the operation matching engine 200 and the action unit 202 may include other or additional modules or components.

The operation matching engine 200 and the action unit 202 may each comprise registers and combinational logic configured and arranged to produce sequential logic circuits. In an embodiment, the operation matching engine 200 and the action unit 202 are software modules or libraries containing program instructions pertaining to the methods described herein, that may be stored on computer readable media, such as computer readable medium 130, and executable by one or more processing elements, such as CPU 102. Other computer readable media may also be used to store and execute these program instructions. In alternative embodiments, various combinations of software and hardware, including firmware, may be utilized to implement the present invention.

The high-level technical computing environment 124 (FIG. 1) may include a plurality of operations, tasks, functions, methods, scripts, programs, etc. As used herein, the term "operations" is intended to include operations, tasks, functions, methods, scripts, programs, etc. These operations may be predefined within the technical computing environment 124 or they may be created by a user and stored within or otherwise made accessible to the technical computing environment 124. The operations may be stored, e.g., in memory 104 and/or disk drive 108 in a function library. Exemplary operations include plotting functions, signal processing functions, image processing functions, data analysis functions, such as curve fitting, transformation functions, matrix operations, Boolean operations, database manipulation functions, report generation functions, simulation functions, write operations on files, communication operations on remote web sites or network locations, etc.

The operations, moreover, execute on one or more input arguments and may generate one or more output arguments. Each of the input arguments, moreover, for a given operation typically needs to satisfy one or more constraints in order for the given operation to execute properly, e.g., without error. If the given operation is called with input arguments that do not satisfy the constraints, the given operation may fail to execute or the execution of the operation may cause one or more error conditions or messages.

For example, an operation that produces a two-dimensional, e.g., x-y, line graph on display 120, such as the 'plot' function in the MATLAB® technical computing environment, can operate on a single column of numeric values, a matrix of numeric values, a matrix and a vector of compatible size, or two matrices of compatible size. An operation that creates a two-dimensional pie chart, such as the 'pie' function in the MATLAB computing environment, can operate on a matrix or a vector of numeric values.

Figure 3A:
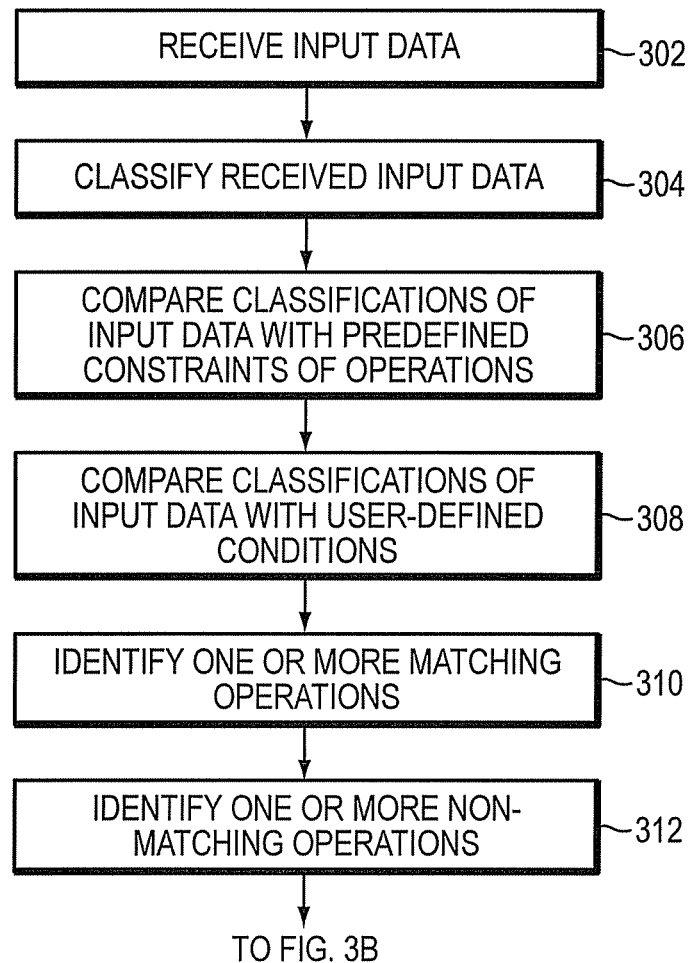
FIGS. 3A-B, 7A-B, and 12A-C are flow diagrams of methods in accordance with embodiments of the present invention.

FIG. 3 is a flow diagram of a method in accordance with an embodiment of the present invention. Input data is received by the operation matching engine 200 (FIG. 2), as indicated at block 302. The input data may be one or more scalars, vectors, matrices or multi-dimensional arrays of values, such as numeric, character or Boolean values, and may be stored, e.g., at memory 104 (FIG. 1) and/or disk drive 108. Those skilled in the art will understand that the input data may be selected or specified in many different ways. For example, the input data may be selected or specified by a user, e.g., from a file. Alternatively, the input data may be generated through the execution of a function, script or program. In other embodiments, the input data may be collected over a period of time from a data acquisition device, such as a transducer, a video camera, etc., downloaded from remote computational devices, etc.

Workspace and Variable Editor Windows

Figure 4:
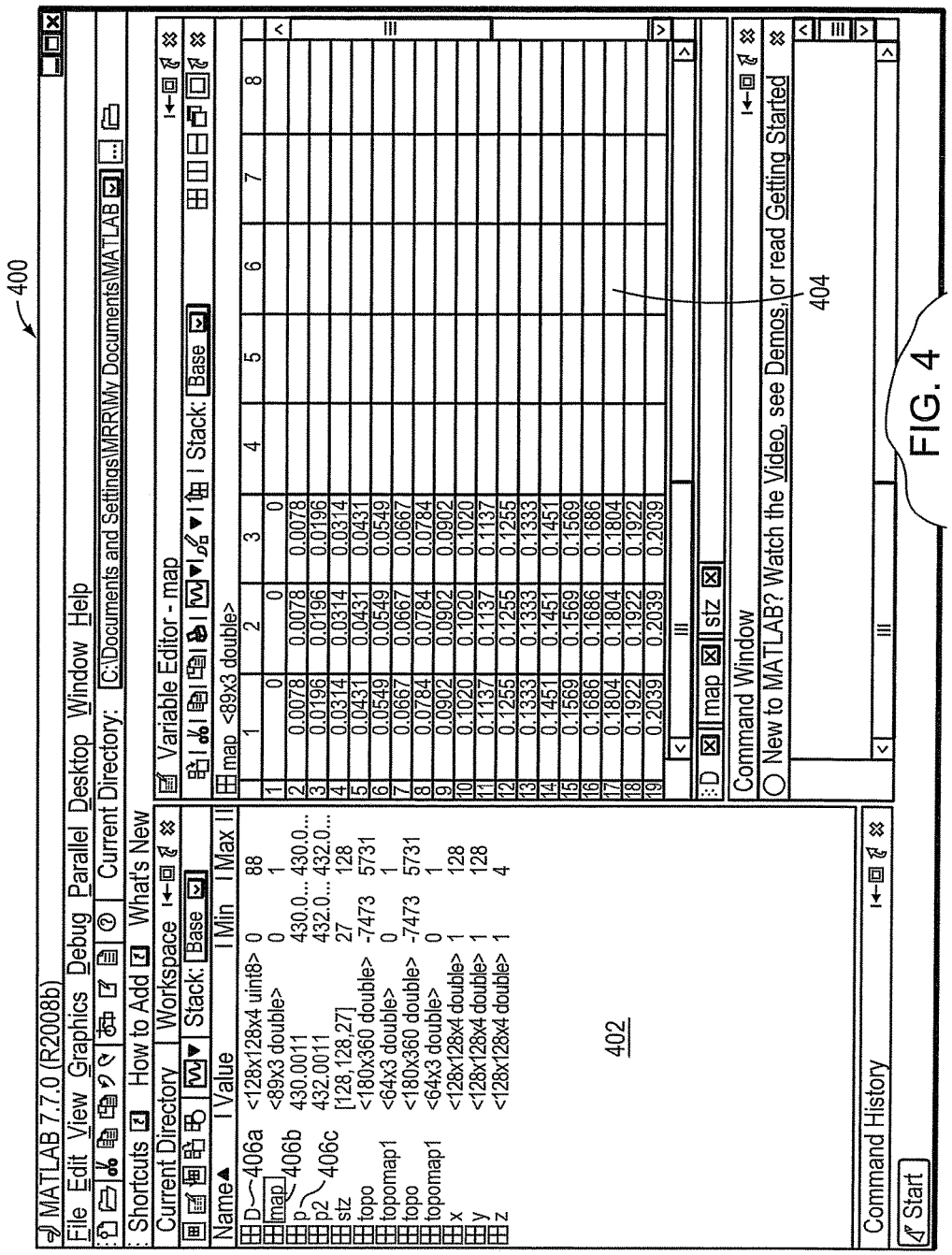
FIGS. 4-6, 8-11 and 13-16 are schematic illustrations of user interfaces in accordance with embodiments of the present invention.
Figure 5:
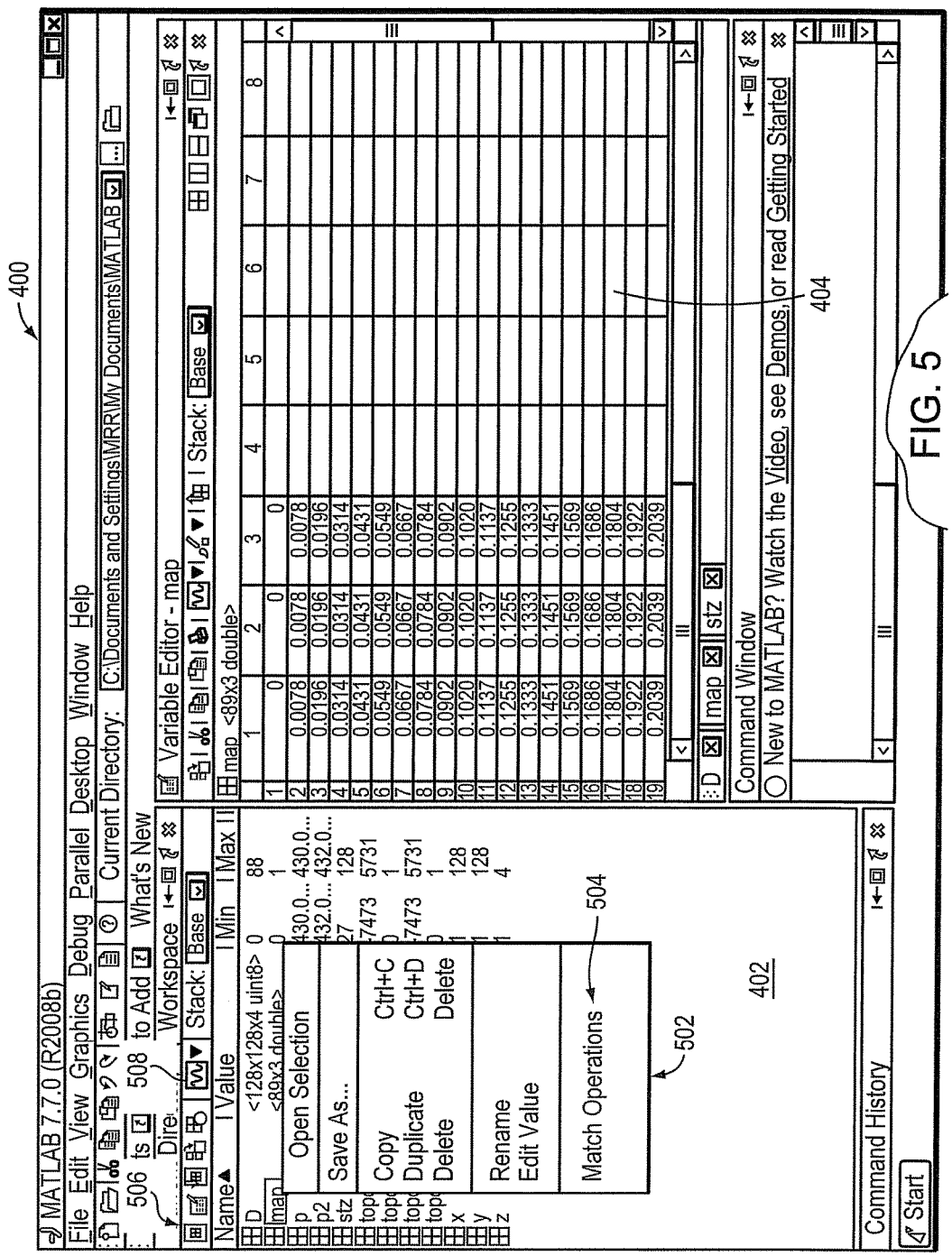
Figure 6:
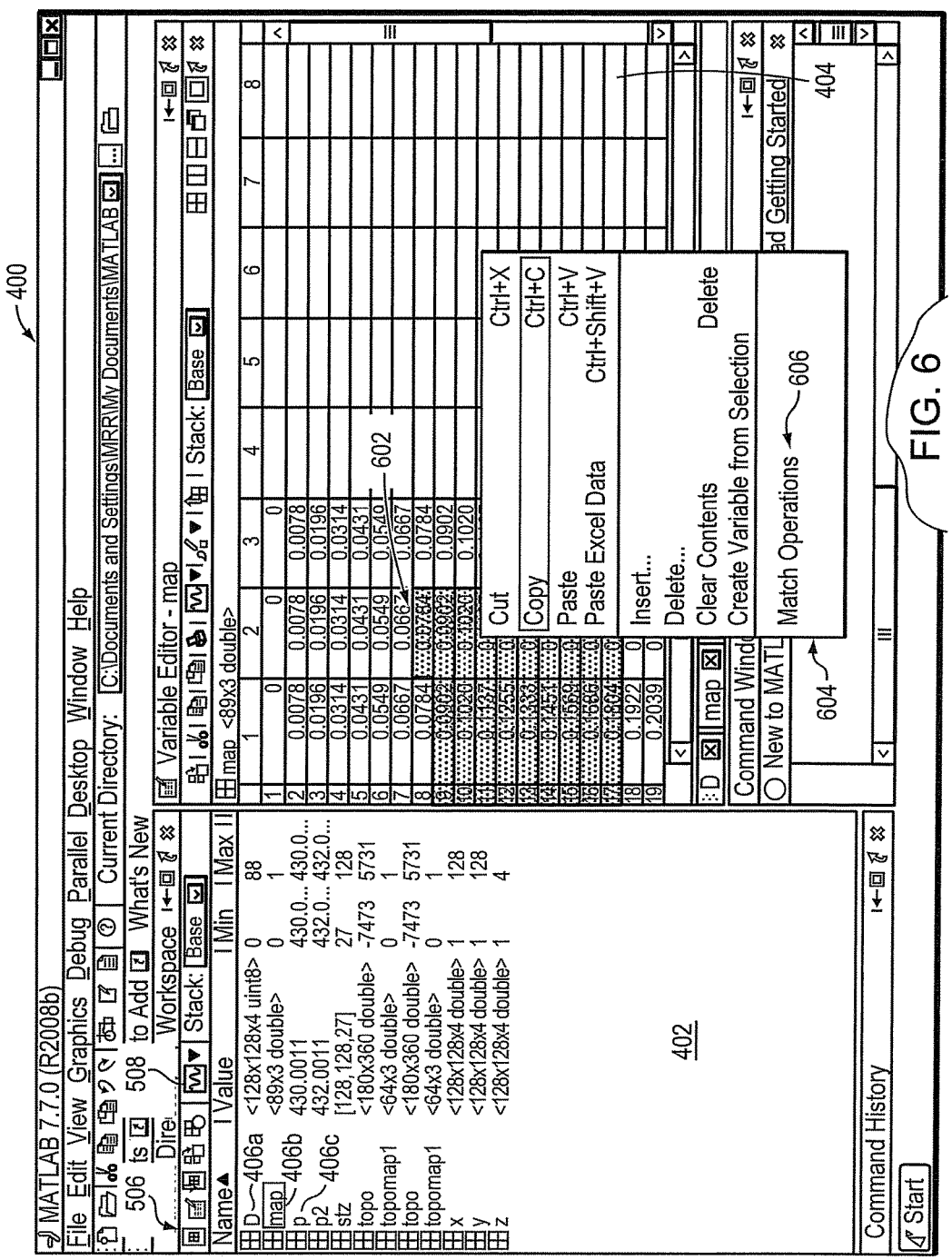

In an embodiment, the user may select desired input data by manipulating, e.g., with the mouse 118 and/or keyboard 116, a desktop graphical user interface (GUI) of the high-level technical computing environment 124 as presented on display 120. The desktop of the MATLAB® product, for example, includes a Workspace window and a Variable Editor window. FIGS. 4-6 are schematic illustrations of a desktop user interface 400 of the technical computing environment 124 including a Workspace window 402 and a Variable Editor window 404. The Workspace window 402 lists the variables from the current programming environment session, which are stored in memory. The Workspace window 402 displays the name, value (or matrix size for matrices), and minimum and maximum values for variables that have a range of values. Specifically, the Workspace window 402 includes a plurality of entries, such as entries 406a-c, arranged as rows, each corresponding to a variable, such as the variables "D", "map", and "p", respectively. The Variable Editor window 404 displays the values assigned to a variable selected, e.g., with the mouse 118, from the Workspace window 402, such as the variable "map". The Variable Editor window 404 may present the values of the selected variable in a cell array or grid format having a plurality of rows and columns that define cells for holding values. As shown, the variable "map" is an 89×3 matrix of double precision numeric values.

A user may select as input data all or just some portion of the values associated with a variable from the current technical computing environment session. Specifically, a user may call up a context window associated with one or more variables selected from the Workspace window 402, e.g., by right-clicking the variable with the mouse 118.

FIG. 5 illustrates a context window 502 called up for the "map" variable from the Workspace window 402. The context window 502 displays a plurality of commands, arranged as a vertical list, e.g., "Open Selection", "Save As", "Copy", "Duplicate", etc., each of which may be performed on the selected variable. In an embodiment, the operation matching engine 200 may be configured to include a "Match Operations" command 504 in the context window 502. Selection of the Match Operations command 504 may cause the values associated with the selected variable to be selected as input data 204 (FIG. 2), and may cause the operation matching engine 200 to run using that input data.

Alternatively or additionally, the Workspace window 402 may include a toolbar 506 with a plurality of buttons, including a Match or Plot button 508. Selection of the Match or Plot button 508 may cause the operation matching engine 200 to run using the values associated with the selected variable from the Workspace window 502 as the input data.

In yet another embodiment, a user may select just a portion of the values associated with a particular variable as the input data, and direct the operation matching engine 200 to run using just these selected values as the input data. Specifically, a user may select, e.g., double click with the mouse 118, a particular variable, e.g., "map", in the Workspace window 402. In response, the technical computing environment 124 may present the values for that variable in the Variable Editor window 404. The values may be displayed in the cells of a cell array. A user may then designate just a portion of the values for this variable as presented in the Variable Editor window 404, e.g., by using the mouse to highlight the desired values. The selected values may or may not be contiguous cells of the cell array.

FIG. 6 illustrates a selection 602 of some of the values of the "map" variable in the Variable Editor window 404. Specifically, the values in columns 1 and 2 and rows 8-27 have been selected as indicated by the highlighting of these values. As with the Workspace window 402, a user may then call-up a context window 604, e.g., by right clicking the highlighted values with the mouse 118. The context window 604 for the Variable Editor window 404 also may include a "Match Operations" command 606. Selection of the Match Operations command 606 by the user may cause the operation matching engine 200 to run using the selected values from the Variable Editor window 404, i.e., the values contained in columns 1 and 2 and rows 8-27, as the input data 204 (FIG. 2).

The evaluator 206 (FIG. 2) may classify the input data, as indicated at block 304 (FIG. 3). For example, the evaluator 206 may determine the dimensions of the input data 204. Exemplary dimensions include scalar (a single value), vector (a row or column of values), matrix (a two-dimensional, rectangular shaped data structure), and an array, which may be similar to a matrix but has three or more dimensions. The evaluator 206 may also determine the particular type of input data, such as numeric values, logical values, character values, strings, etc. The evaluator 206 may also determine what the input data represents, such as image data, audio data, data generated by a transducer, such as a pressure or temperature transducer, etc.

The evaluator 206, in cooperation with the technical computing environment 124, may execute a plurality of matrix-based functions on the input data in order to classify the input data. Exemplary functions include the 'length', 'isnumeric' and 'ndims' functions of the MATLAB® product, which determine the length of the longest dimension of a matrix, tests whether the elements of a matrix are numeric values, and determines the number of dimensions of a matrix, respectively. Those skilled in the art will understand that other functions may be used instead of or in addition to those identified above. The evaluator 206 may store the classifications of the input data in memory.

The evaluator 206 may compare the classifications of the input data with the pre-defined constraints 208 to identify those operations whose input argument constraints are satisfied by, e.g., compatible with, the input data, as indicated at block 306. In comparing the classifications of the input data to the input argument constraints of the operations, it should be understood that the evaluator 206 may consider a given classification of the input data to satisfy multiple input argument constraints. For example, the evaluator 206 may consider a matrix to also be a plurality of vectors for purposes of determining whether there is a match to the input argument constraints of one or more operations. Alternatively or additionally, the evaluator 206 may compare the classifications of the input data with the user-defined conditions 210, as indicated at block 308.

In an embodiment, the user-defined conditions 210 and the pre-defined constraints 208 may be combined, such that each operation has its own classification algorithm that is evaluated on whatever input data is selected, and decides whether the corresponding operation matches or not. Users may create or modify the classification algorithm corresponding to any operation. It should be further understood that either the pre-defined constraints 208 or the user-defined conditions 210 may be omitted. Furthermore, the predefined constraints 208 and/or the user-defined conditions 210 may be included within the evaluator 206 itself.

Figure 3B:
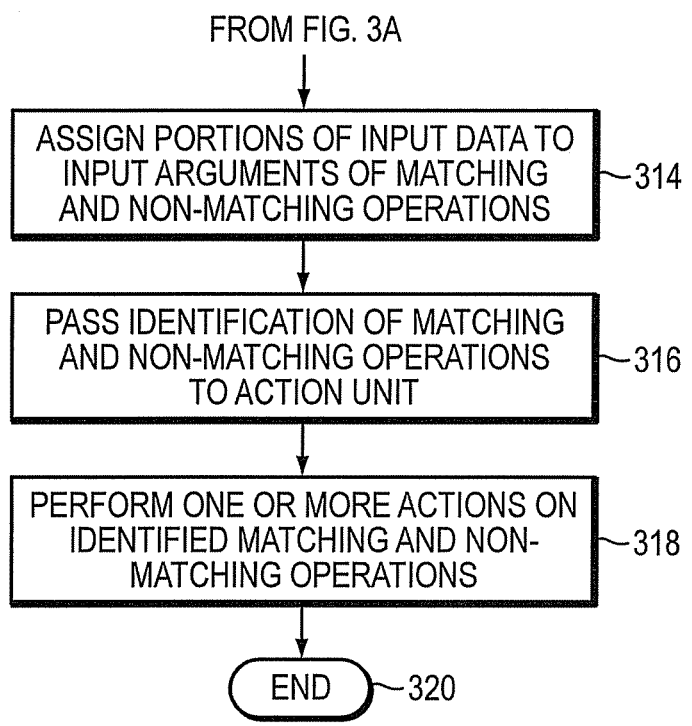

One or more operations may be identified as a result of the comparing performed at steps 306 and 308, as indicated at block 310. The evaluator 206 also may identify those operations whose input argument constraints are not satisfied by the input data, as indicated at block 312. To the extent an operation identifies its input arguments by variable names, e.g., "x" and "y", the evaluator 206 may identify and assign respective portions of the input data to these input argument variables, as indicated at block 314 (FIG. 3B). For example, if the selected input data comprises two vectors, a first vector may be assigned to the variable "x", and the second vector may be assigned to the variable "y". The operation matching engine 200 may pass the identification of the matching and non-matching operations to the action unit 202 for further processing or action, as indicated at block 316. The action unit 202 may perform one or more actions on receiving the identification of the matching and non-matching operations, as indicated at block 318. Processing may then complete as indicated by end block 320.

In an embodiment, actions may only be performed if the user triggers the action on a matching (or non-matching) operation, e.g., via a mouse click or button press.

It should be understood that, in some circumstances, there may be no matching or no non-matching operations.

Figure 7A:
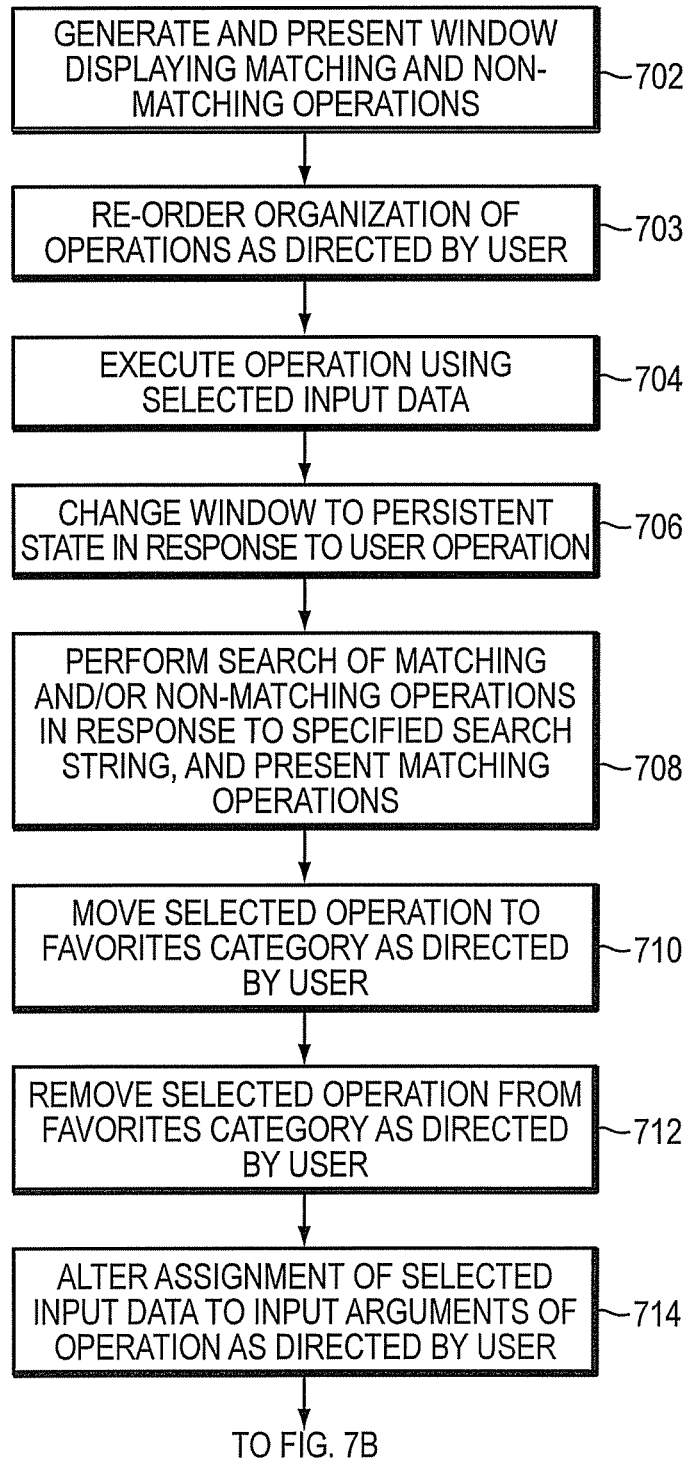
Figure 7B:
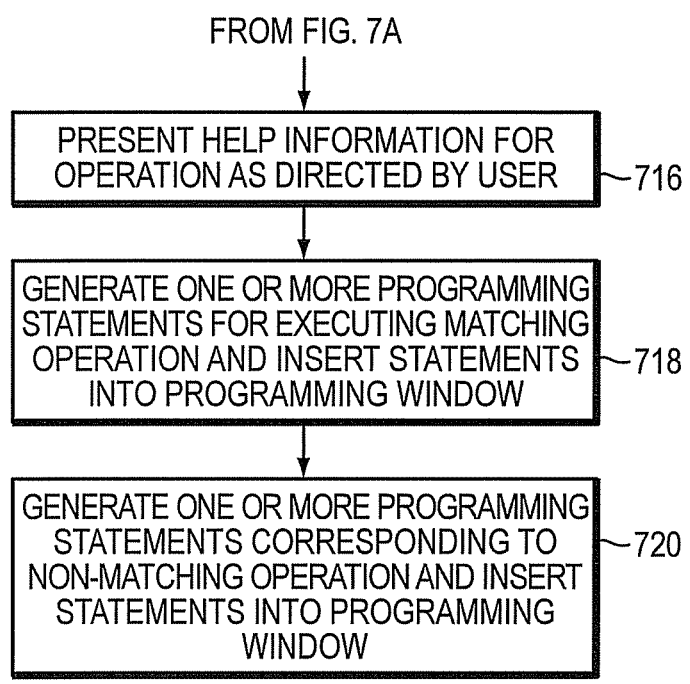

In an embodiment, the action unit 202 presents information to the user regarding the identification of the matching and the non-matching operations, and may execute selected matching operations and/or generate programming code for selected matching or non-matching operations. FIGS. 7A and 7B are a flow diagram of an embodiment of a method for performing one or more actions on matching and non-matching operations. Specifically, the display generator 216 of the action unit 202 may generate a window, such as a popup window, for presentation on the display 120, as indicated at block 702.

Plotpicker Popup Window

Figure 8:
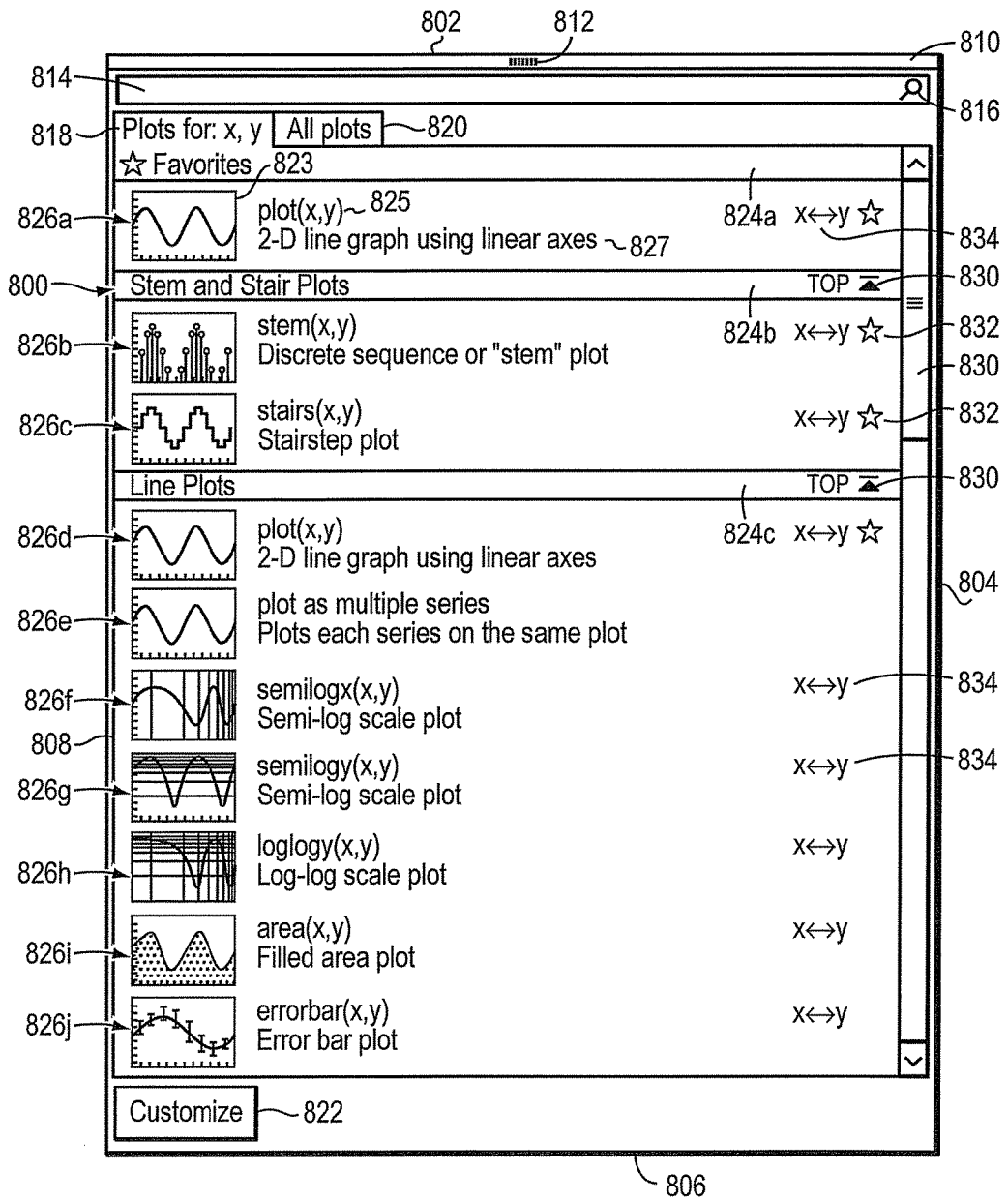

FIG. 8 is a schematic illustration of a popup window 800 that may be created by the display generator 216 of the action unit 202, and presented on the display 120. The popup window 800 may be generally rectangular in shape, having a horizontal top edge 802, a vertical right edge 804, a horizontal bottom edge 806, and a vertical left edge 808. Located adjacent to the top edge 802 may be a tear-off area 810 having a tear-off command button 812. Below the tear-off area 810 may be a horizontal text box 814 for receiving search strings from the user. A command button 816 for initiating a search may be located at the right of the text box 814.

In an embodiment, searches may be automatically initiated, e.g., one second after the user types each keystroke, or upon selecting an "enter" key of the keyboard, and the search results updated accordingly.

Below the text box 814 may be a plurality of tabbed, overlapping view panes, such as a Matching Operations, e.g., "Plots for: x, y", view pane 818 and an All Operations, e.g., "All Plots", view pane 820. Below the view panes 818 and 820 may be located a customization command button 822. Each view pane 818, 820 of the popup window 800 may contain a flat list of items, i.e., operations, which may be organized, e.g., subdivided, into categories that may be separated by descriptive headers. The descriptive headers may include a "Favorites" header 824a, and in the example where the operations are plotting functions, may also include a "Stem and Stairs Plots" header 824b and a "Line Plots" header 824c. As described herein, the Favorites category 824a includes those operations designated by the user as his or her favorite operations. The Favorites category 824a, moreover, may appear on top, i.e., above all of the other categories of operations.

As mentioned above, the matching operations view pane 818 may contain a flat list of entries, including entries 826a-j, where each entry corresponds to an operation whose input argument constraints are satisfied by the selected input data 204. To the extent the list of matching operations exceeds the size of the view pane 818, a vertical scroll bar 826 may be provided to move through the entire list. Each entry in the list, such as entry 824a, may include a thumbnail image of the respective plot type 823, the name of the plot 825, and a description of the type of the plot 827. Each descriptive header 824 (other than the Favorites header 824a) may include a 'move to top' command button 830, such as an up arrow. Upon selection of the 'move to top' command button 830, e.g., with the mouse 118, the display generator 216 may move the respective group of operations to the top of the list, as indicated at block 703. In this way, a user may customize the order of categories in the view pane 818. The user specified order, moreover, may be saved by the display generator 216, and utilized during its next operation.

In response to the selection of an entry 826 in the matching operations view 818, e.g., with the mouse 118, the action unit 202 may cause the respective operation to be executed utilizing the selected input data 204, as indicated at block 704. Where the operations are plotting functions, for example, selecting an entry causes the respective plotting function to be executed by the technical computing environment 124, which results in the presentation of a plot window (not shown) on the display 120. In an embodiment, although the focus of the display 120 switches to the plot window, the popup window 800 remains on the display 120. A user may thus quickly and efficiently select numerous operations from the view pane 818 to explore the different plotting functions that are available without the popup window 800 losing focus, which would then require the user to callback the popup window 800 after having selected each plot entry.

Figure 9:
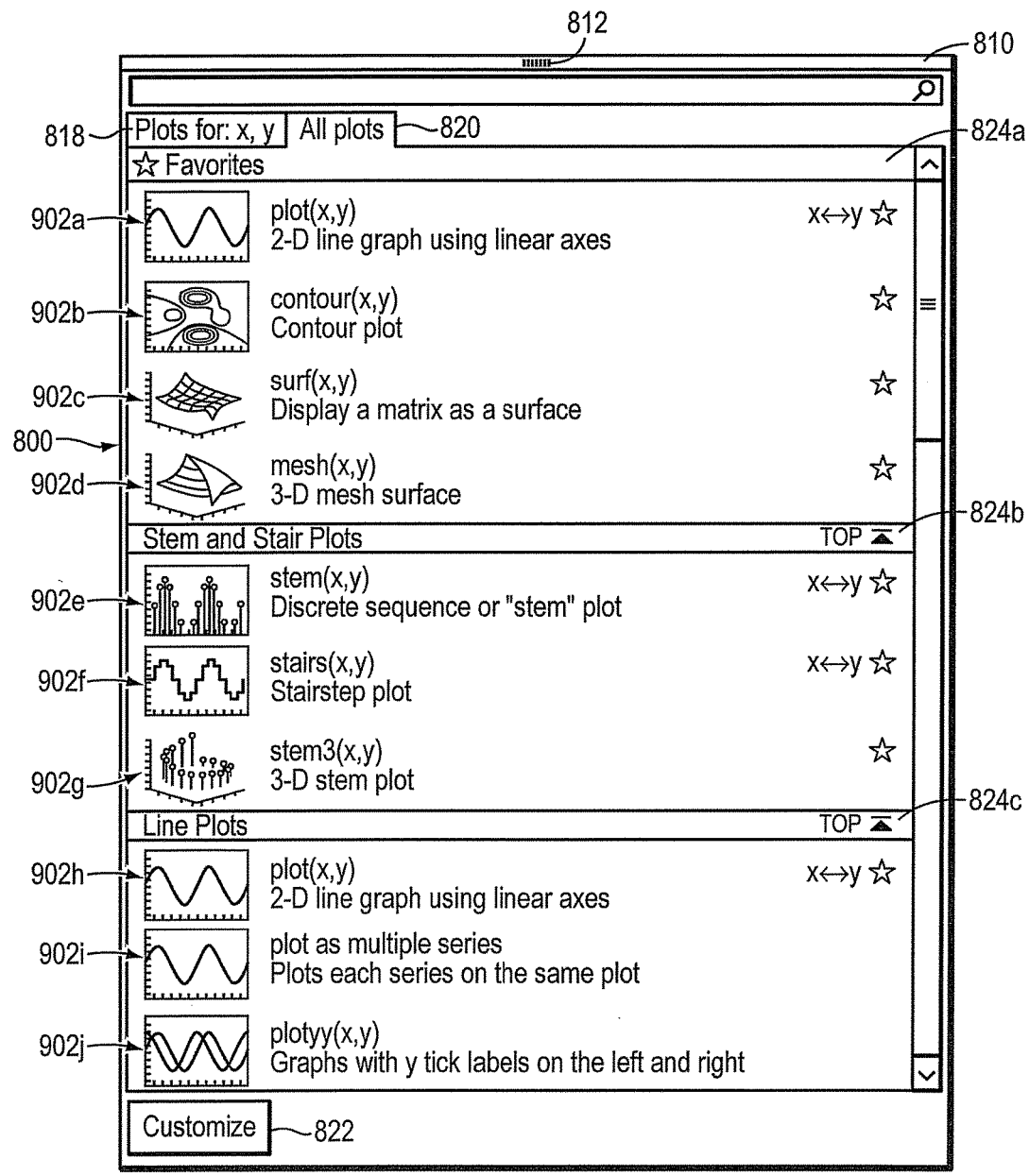

FIG. 9 is a schematic illustration of the popup window 800 showing the All Operations view pane 820. The All Operations view pane 820 may contain a flat list of entries, including entries 902a-j, that correspond to all of the operations that were evaluated by the operation matching engine 200. Unlike the Matching Operations view pane 818, however, the all operations view pane 820 also includes operations whose input argument constraints are not satisfied by the input data 204. As with the matching operations pane 820, each entry 902 in the list of view pane 820 may include a thumbnail image of the respective plot type, the name of the plot and a description of the type of the plot. The entries 902, moreover, also may be organized into categories separated by headers, such as the Favorites header 824a, the Stem and Stairs Plots header 824b, and the Line Plots header 824c. In an embodiment, the operations whose input argument constraints are not satisfied by the input data are displayed differently in view pane 820 from the operations whose input argument constraints are satisfied. For example, the operations whose input argument constraints are not satisfied, such as entries 902b-d, may be grayed out relative to the operations whose input argument constraints are satisfied, such as entry 902a. These non-matching operations may also be rendered un-executable. That is, unlike the matching operations, they may not be selected for execution by the user.

It should be understood that, instead of or in addition to the All Operations view pane 820, the display generator 216 may generate a view pane listing just the non-matching operations. It should be further understood that the display generator may present a view pane for each type of operation, e.g., Plotting, Signal Processing, etc., or for each category, e.g., Line Plots, Stem and Stair Plots, etc. It should also be understood that the display generator 216 may present the matching and/or non-matching operations in a hierarchical tree structure, rather than a flat list.

Tear-Off Feature

Referring back to FIG. 8, in an embodiment, the priority of the popup window 800 relative to other windows on the display 120 may be modified by the user. As understood by those skilled in the art, a window manager component (not shown) of the operating system 122 typically controls the front-to-back order of the windows displayed on a display screen, such as display 120. This front-to-back positioning may be referred to as the "z-order" of the windows, which is named for the z-axis of a three-dimensional coordinate system, where z is the coordinate extending into the screen. Selection of a window typically gives "focus" to that window, and causes the display to be redrawn with the selected window appearing over and thus hiding the other windows that are "underneath" it.

In an embodiment, in response to the selection of the tear-off command button 812 by the user, e.g., with the mouse 118, the display generator 216 in cooperation with the operating system 122 changes the priority state of the popup window 800. Initially, e.g., before the selection of the tear-off command button 812 by the user, the operating system 122 assigns a standard operating state to the popup window 800. Accordingly, if the user selects another window on the display 120 or otherwise transfers focus from the popup window 800 to another displayed window, the popup window 800 may be hidden behind the newly selected window. In response to the user selecting the tear-off command button 812, e.g., with the mouse 118, the display generator 216 and/or operating system 122 may change the state of the popup window 800 to a persistent state, as indicated at block 706. While in this persistent state, the popup window 800 may remain on the top of the display 120, even though the user may select another window or transfer focus away from the popup window 800 to some other window. In addition, a user may "grab" the tear-off button 812, and drag the popup window 800 to a new location on the display 120.

Searching

In an embodiment, a user may perform a search of the entries contained on the Matching Operations view pane 818 or of the entries contained on the All Operations view pane 820. Specifically, the user may enter, e.g., with the keyboard 116, a textual phrase or string in the horizontal text box 814. Thereafter, the user may select the search command button 816. In response, the display generator 216 may perform a search of the entries on view panes 818 or 820, depending on which view pane is presented when the search command button 816 is selected, using the search string entered by the user, as indicated at block 708. Searches may be performed on the names 825 of the operations listed in the view panes 818 or 820, on the descriptions 827 of the operations, and/or on documentation or help information associated with operations listed in the view panes 818 or 820. Those entries matching the search may be displayed in the view pane 818 or 820, while those entries that do not match the search may be omitted from the view pane 818 or 820, as also indicated at block 708. That is, a filtered list that only contains those entries that match the search string may be generated and displayed to the user.

It should be understood that the display generator 216 may employ regular expression matching routines when conducting searches on the entries of view panes 818 and 820.

Designating Operations as Favorites

Each entry listed on view panes 818 and 820 may also include a favorites command button 832. The user may select the favorites command button 832 to designate the corresponding operation as one of the user's favorite operations. In response to the user selecting the favorites command button 832 associated with a particular operation, the display generator 216 may move the operation to the favorites category 824a, as indicated at block 710. As described above, the favorites category 824a is the top most displayed category shown on view panes 818 and 820. The favorites command button 832, which may be in the form of a star (or some other icon), may be grayed out prior to selection by the user. In response to the user selecting the favorites command button 832 of an operation already part of the favorites category 824a, the display generator 216 may remove the respective operation from the favorites category 834a and return it to its original category, as indicated at block 712.

In an embodiment, operations designated as favorites by the user may still be included within their respective categories as well. In this embodiment, the designation of an operation as a favorite elevates a copy of that operation to the favorites category.

The identification of selected operations as favorites by the user may be stored in memory and also may be used in other components of the technical computing environment 124. For example, operations designated as favorites that match selected input data may be listed in the context menus 502 and 604 of the Workspace and Variable Editor windows, for easy selection by the user. They may also appear in main menu items of the Workspace and Variable Editor windows, among other windows of the desktop of the technical computing environment.

Altering the Order of the Input Data

One or more of the entries listed on view panes 818 and 820 may include a transpose data command button 834. In response to the user selecting the transpose data command button 834, the display generator 216 may alter the assignment of input data to the input arguments of the corresponding operation, as indicated at block 714. For example, suppose, an operation, such as a line plotting function, takes two vectors as its input arguments, which are designated as variables "x" and "y". Suppose further that the input data is two columns of data and that the first column is initially assigned to the variable "x", and the second column is assigned to variable "y" by the evaluator 206. By selecting the transpose data command button 834 for this operation, the user may cause the first column of input data to be assigned to the variable "y", and the second column of input data to be assigned to the variable "x".

Tooltip

The help utility 220 of the display generator 216 may be configured or adapted to present help information to the user regarding the operations listed in the view panes 818 and 820. As indicated above, the All Operations view pane 820 presents both matching operations and non-matching operations. In response to the user selecting an entry, e.g., by clicking on the entry with the mouse 118, the help utility 220 may cause a help window to be presented on display 120, as indicated at block 716 (FIG. 7B). The help window may also be referred to as a "tooltip" window.

Figure 10:
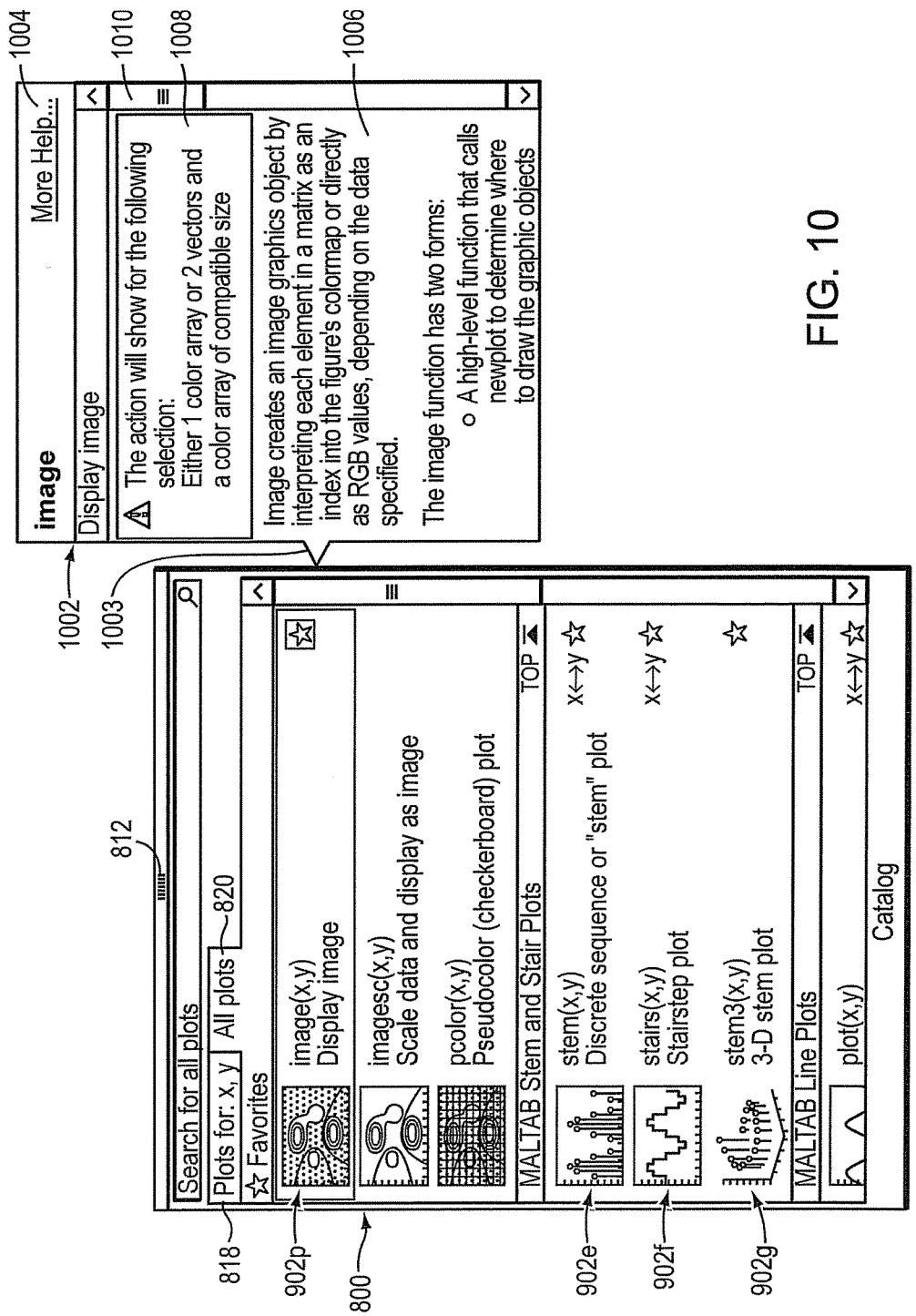

FIG. 10 is a schematic illustration of the popup window 800 with a tooltip window 1002. As shown, the tooltip window 1002 may be linked to a corresponding entry, e.g., an 'image' entry 902p, in the All Operations view pane 820. For example, the tooltip window 1002 may include an arrow or pointer 1003 that points the entry of the all operations view pane 820, i.e., entry 902p, with which the help or other information relates. The tooltip window 1002 may include a header area 1004 that displays the name of the respective operation. The tooltip window 1002 also may include a main area 1006. To the extent the selected input data is not compatible with the input argument constraints of the selected operation, the help utility 220 may include a warning message, such as warning message 1008, in the main area 1006 of the tooltip window 1002. The warning message 1008 may provide an indication of the type of input data that would satisfy the input argument constraints of the respective operation. The warning message 1008 also may provide a description of the type or size of additional data that, if selected, would render the selected operation compatible with the operation and thus executable. The warning message 1008 may provide information describing how the input data may be transformed in order to render the selected operation executable.

In addition to the warning message 1008, the main area 1006 also may include documentation regarding the respective operation. For example, the description may provide a detailed explanation of the operation, the manner in which input data is mapped to the input arguments of the operation, etc. The tooltip window 1002 also may include a link to additional information. To the extent the documentation exceeds the size of the tooltip window 1002 a vertical scroll bar 1010 may be provided.

It should be understood that a help window, such as a tooltip window 1002, also may be presented for matching operations. In this case, the tooltip window 1002 may provide documentation for the respective operation.

In an embodiment, the tooltip window 1002 is also presented if the user "hovers" the mouse 118 over an entry in either the Matching Operations view pane 818 or the All Operations view pane 820.

Generating Programming Code

Figure 11:
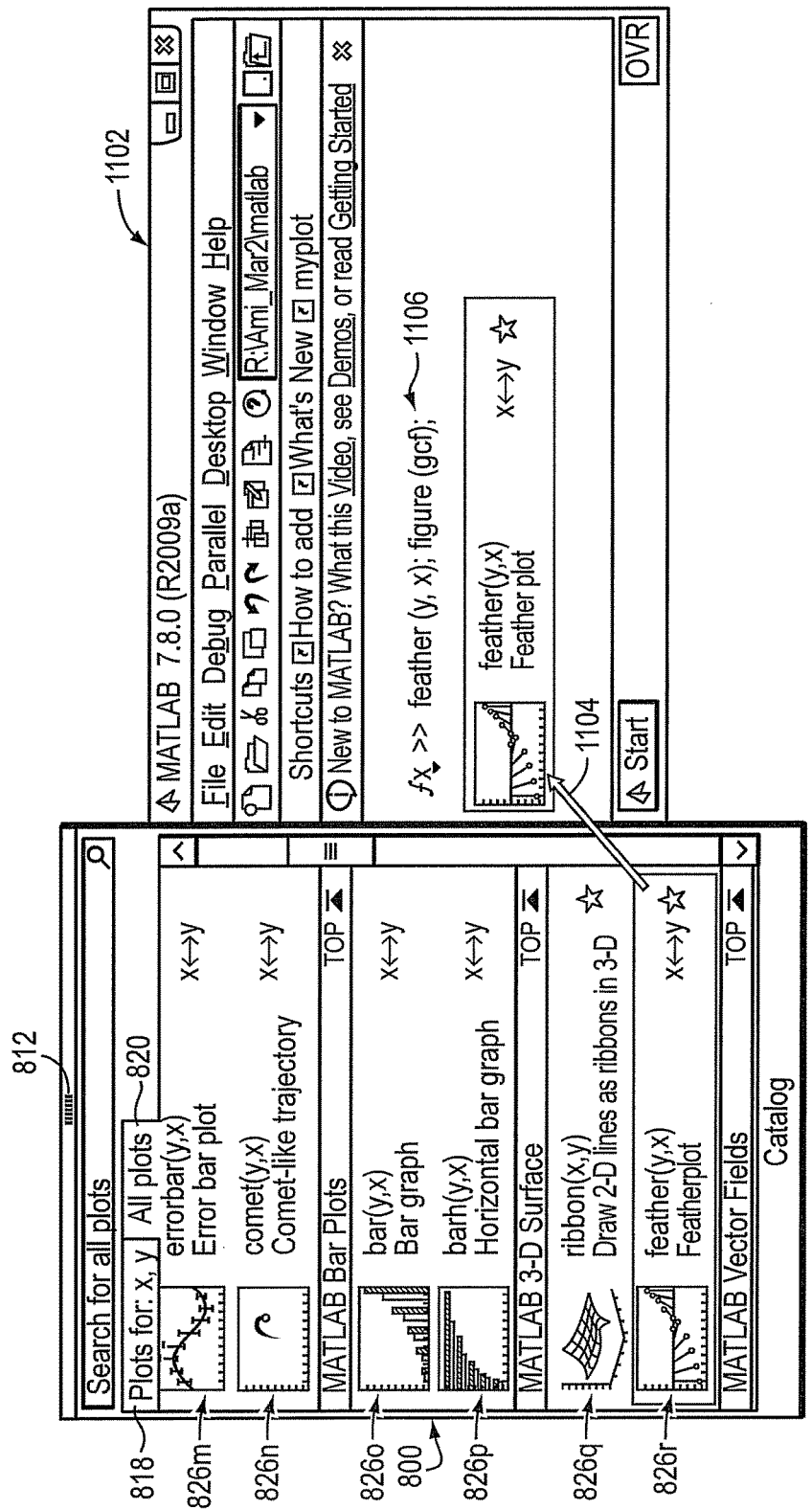

Another action that may be implemented by the action unit 202 is the generation of programming code for a selected operation. FIG. 11 is a schematic illustration of a popup window 800 and a command window 1102, which may be generated by the technical computing environment 124 as part of its desktop user interface. A user may select and drag an entry, e.g., with the mouse 118, such as entry 826r, from the popup window 800 and drop the entry into the command window 1102, as illustrated by arrow 1104. In response to this action by the user, the programming code generator 218 of the action unit 202 may be configured to generate one or more programming code statements for executing the respective operation, and may paste these programming code statements, designated generally at 1106, into the command window 1002, as indicated at block 718 (FIG. 7B). The programming code statements 1106 may conform to the semantics and syntax of the technical computing environment 124, such as the MATLAB® product.

In an embodiment, a user also may drag and drop a non-matching operation from the all operations pane 820 into the command window 1002. In response, the programming code generator 218 may generate one or more programming code statements corresponding to the selected operation, as indicated at block 720. Because the input data does not meet the input argument constraints for this non-matching operation, the programming code statements generated by the programming code generator 218 are not executable in their current form. That is, the programming code statements, if executed, will fail or produce errors. Nonetheless, the user may edit or modify the programming code statements, such as through the designation of addition or other input data, in order to render the programming code statements executable without error or failure.

It should be understood that in addition to or instead of generating text-based programming code statements, the programming code generator 218 may generate one or more graphical code statements. For example, the programming code generator 218 may draw one or more graphical, executable blocks in a graphical code window, and interconnect the one or more blocks. In addition, gestures other than drag and drop may be used to add programming code statements, e.g., copy and paste or direct selection of menu items.

It should be understood that fewer or other steps than those shown in FIGS. 7A and 7B may be performed, and that the order may be changed. It should be further understood that other actions besides displaying and running available plotting functions, and generating programming code may be performed on the identified matching and non-matching operations. For example, rather than displaying the matching and non-matching operations, the action unit 202 may execute, e.g., run, one or more of the matching operations.

Customizing the Matching Algorithms

Figure 12A:
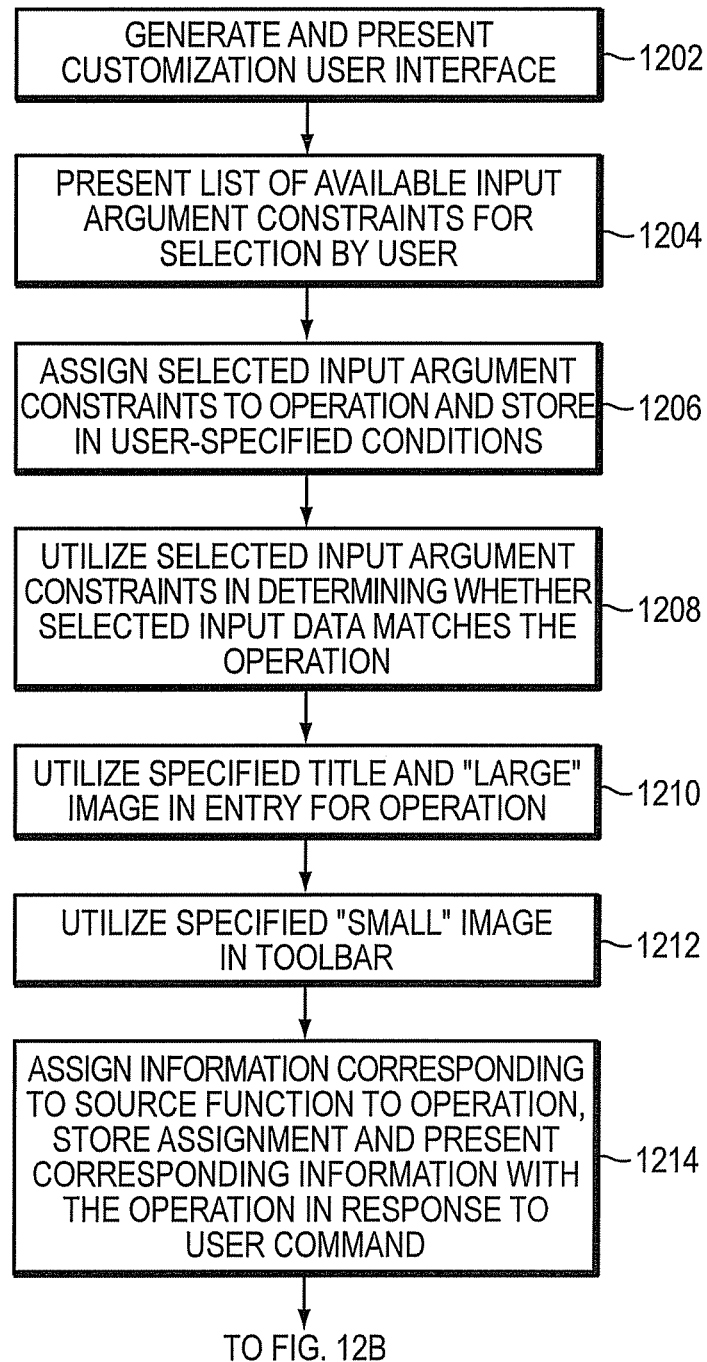

FIG. 12 is a flow diagram of an embodiment of a method for customizing the manner by which operations are determined to match selected input data, and/or to customize the acts performed on matching and/or non-matching operations by the action unit 202. As indicated above, the popup window 800 (FIG. 8) may have a customize command button 822. In response to the selection of the customize command button 822, the customization unit 211 may present a customization user interface on the display 120, as indicated at block 1202. By selecting an operation and manipulating the customization user interface, a user may specify one or more user-defined conditions or rules that may be utilized by the evaluator 206 when determining whether the selected operation matches selected input data. The user also may specify one or more actions to be taken, and may add and configure additional operations.

Figure 13:
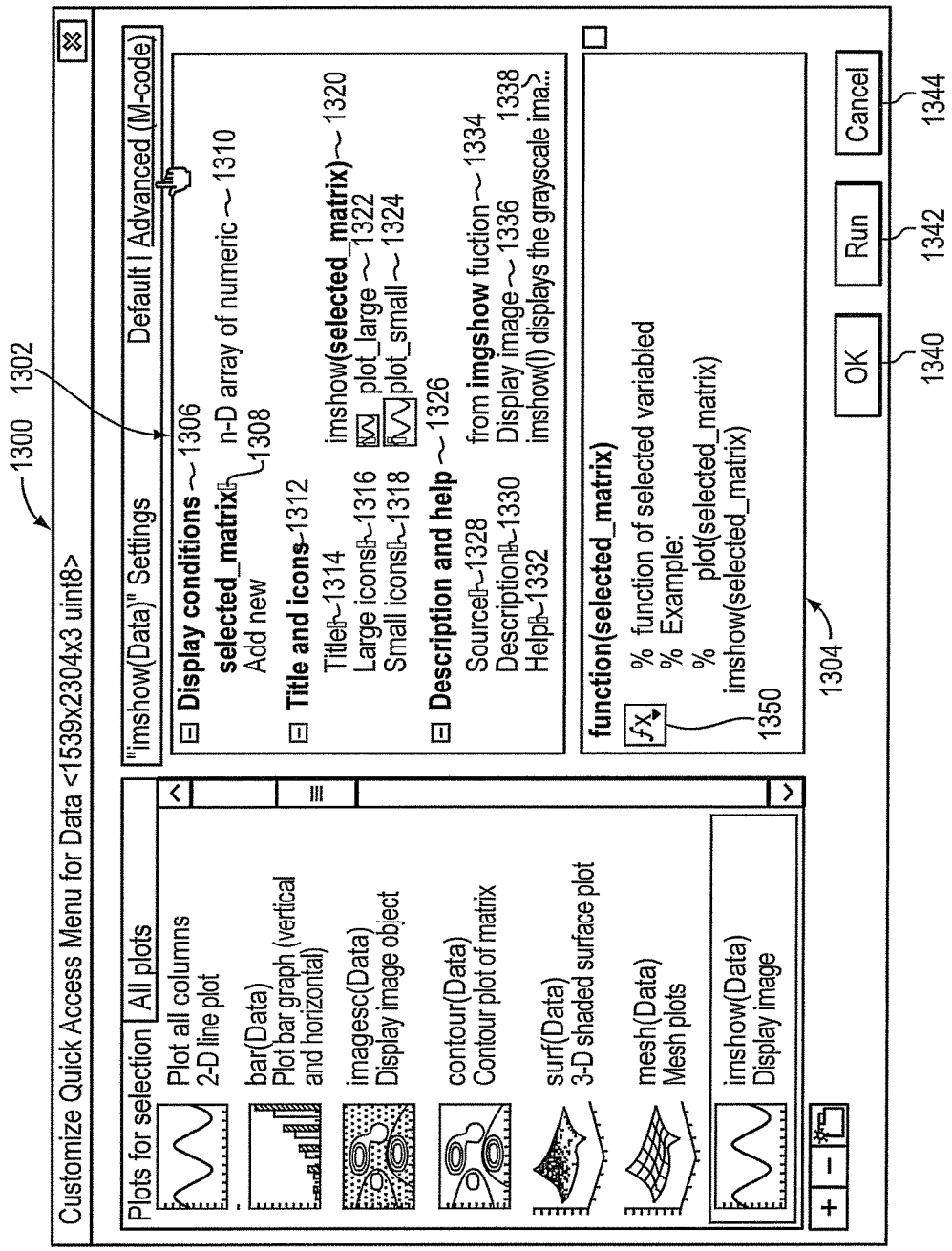
Figure 14:
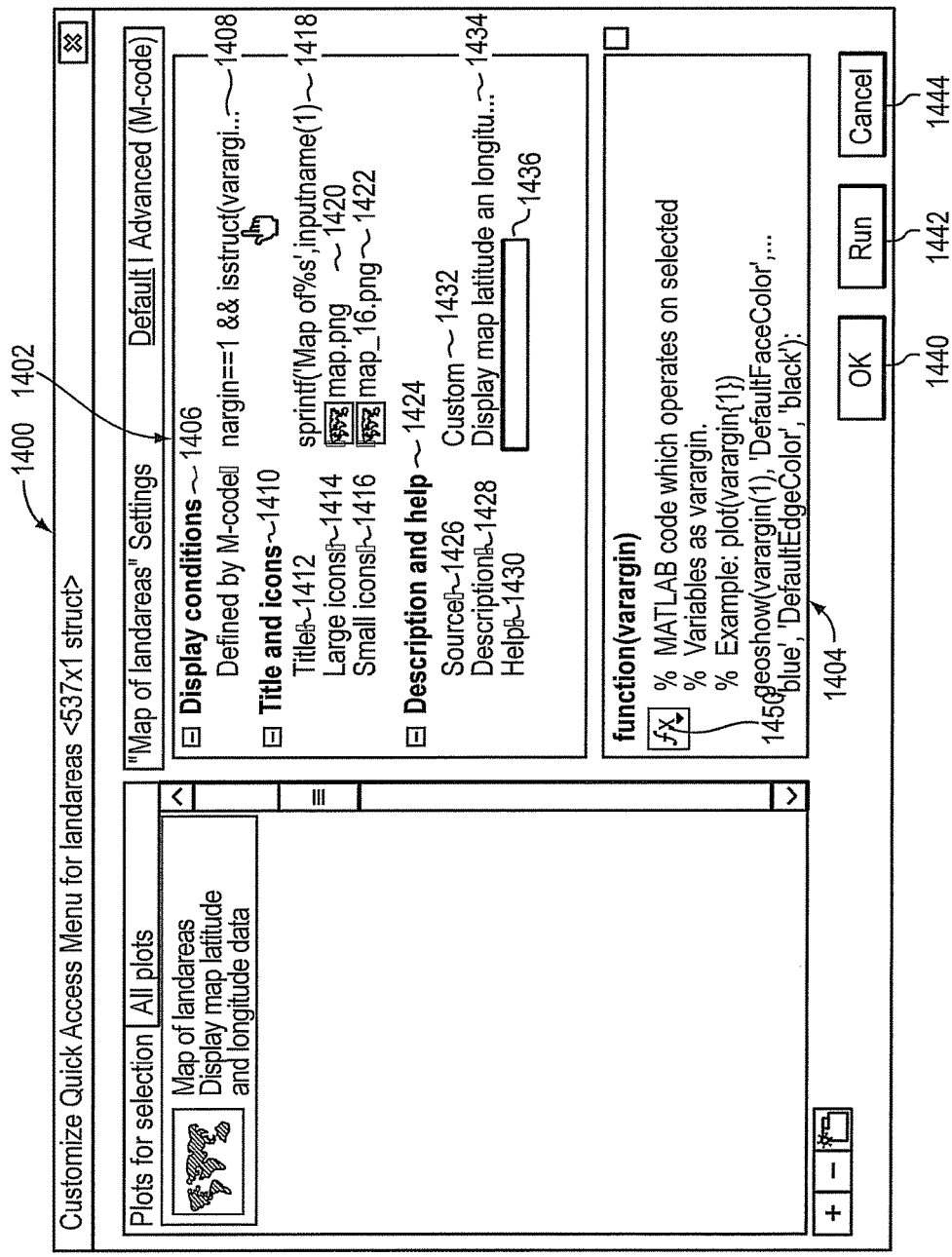
Figure 15:
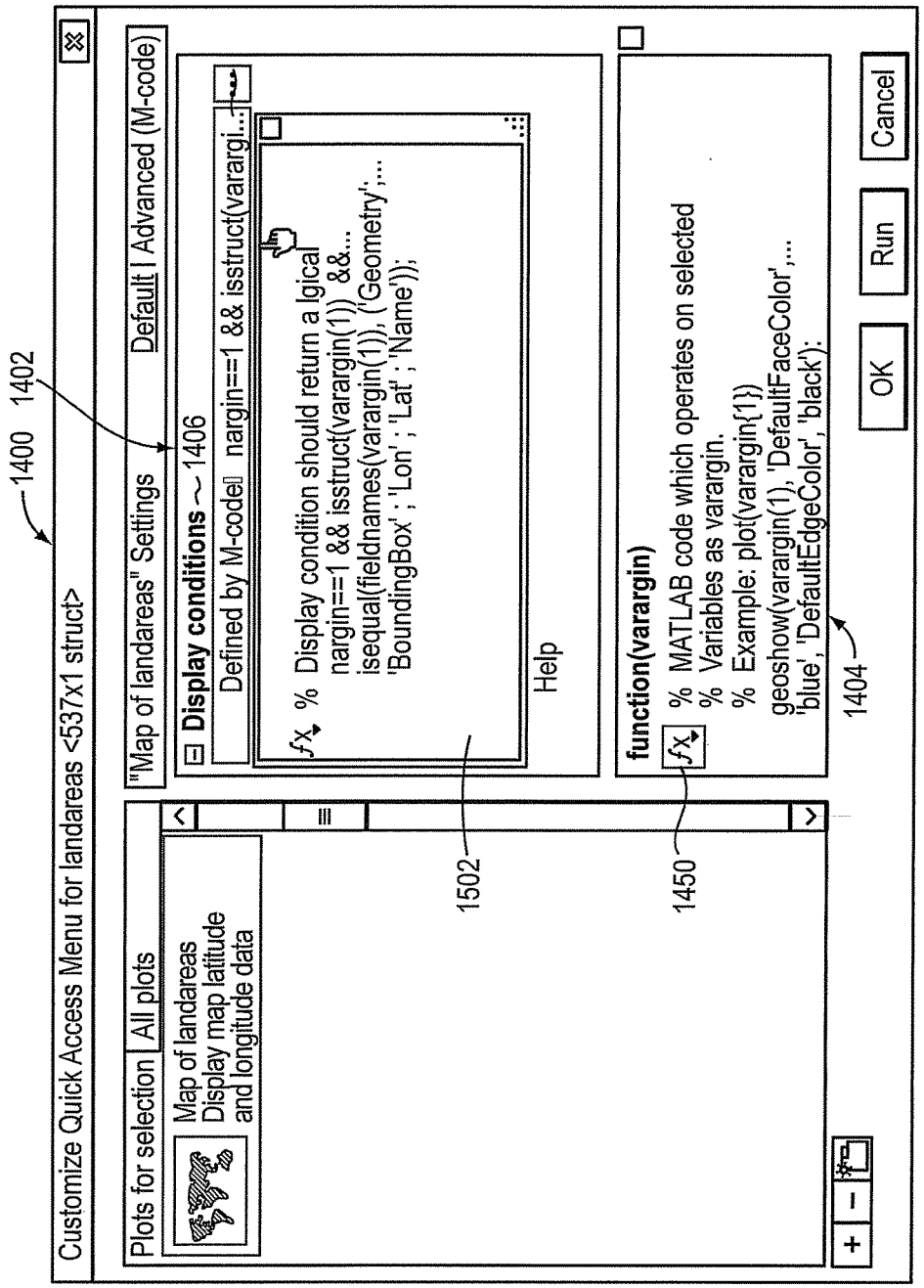

FIGS. 13-15 are schematic illustrations of an embodiment of a customization user interface. In particular, FIG. 13 shows a first customization user interface 1300 according to a default mode of operation, and FIGS. 14 and 15 shows a second customization user interface 1400 according to an advanced mode of operation.

The customization user interface 1300 of FIG. 13 may have a structured information entry area 1302 and an unstructured information entry area 1304. Within the structured area 1302 may be a plurality of fields with corresponding combo boxes or other information entry elements for receiving selections or inputs from the user. The fields and combo boxes of the structured area 1302, moreover, may be organized into groups that are labeled for convenience of the user. For example, a "Display conditions" group 1306 may include an input argument field 1308 and a corresponding combo box 1310 for specifying a condition for the respective input argument. The input argument of field 1308 specifies a variable name that will be associated with the selected input data. It should be understood that the variable name of field 1308 may not be the same variable name used by the function being customized. That is, the technical computing environment 124 may perform a translation of the variable name for the input data to the name of the input argument used by the function.

Upon selection of the combo box 1310 by the user, the customization unit 211 may present the user with a plurality of available options for specifying the input argument constraints for the respective operation, as indicated at block 1204. For example, the combo box 1310 may present the following available options: 'scalar, 'vector, and 'n-D array', among others, combined with any of 'numeric', 'double', 'string', 'integer', and any object type in the workspace, among others. In response to the user selecting a particular option, the customization unit 211 assigns the specified constraints to the respective operation, thereby specifying the input argument constraints that must be satisfied by selected input data in order for this particular operation to match the selected input data, as indicated at blocks 1206 and 1208.

A 'Title and icons' group 1312 may include a "Title" field 1314, a "Large icon" field 1316, and a "Small icon" field 1318, each with a corresponding information entry box 1320, 1322, 1324. In the information entry box 1320 associated with the 'Title' field 1314, the user may enter information, e.g., with the keyboard 1116. The customization unit 211 may store the entered information in memory and, when the corresponding operation is presented in the popup window 800, utilize the information entered by the user as the title 825 of the operation, as indicated at block 1210. Upon selecting the information entry boxes 1322 and 1324 for the 'Large icon' or the "Small icon', the customization unit 211 may present a file system browse box (not shown). The user may navigate the browse box to select an image file, such as a JPEG file, for the 'Large icon' and for the 'Small icon'. The customization unit 211 may store the selected image files, and utilize the selected large icon image file to display in the popup window 800 for the entry for the operation, as also indicated at block 1210. The customization unit 211 may utilize the selected small icon image file to display in a menu bar, such as menu bar 506 (FIG. 5) of the Workspace window 402 for the Match or Plot button 508, as indicated at block 1212. The customization unit 211 may also display the small icon image file in other parts of the technical computing environment's desktop, such as in a menu bar of the Variable editor window 404.

Figure 12B:
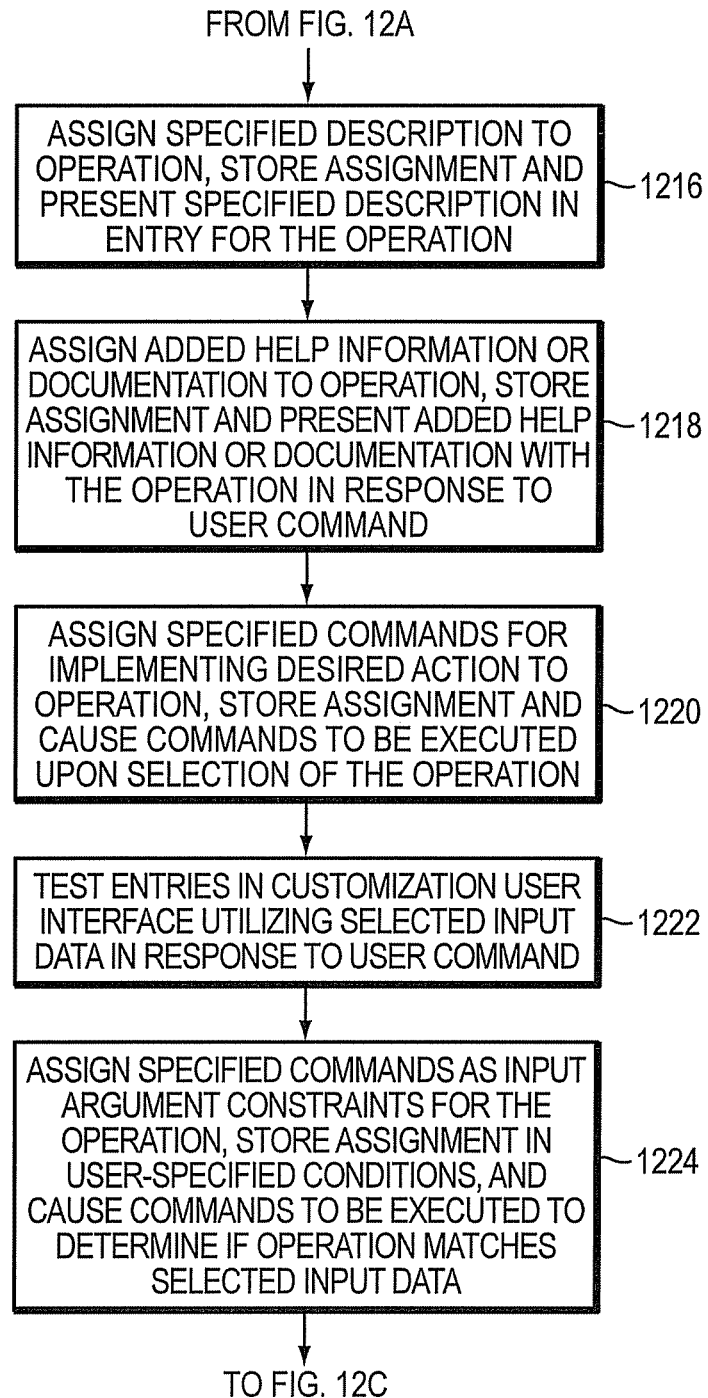

A "Description and help" group 1326 may include a "Source" field 1328, a "Description" field 1330 and a "Help" field 1332, each with a corresponding information entry box 1334, 1336, and 1338. In the information entry box 1334 associated with the "Source" field 1328, the user may identify an operation from the technical computing environment 124 for which help information has already been created and exists. The customization unit 211 may present all of the available operations in a drop down box or, in an alternative embodiment, it may present only those operations that have been entered in the un-structured area 1304 by the user. Rather than select an existing operation, the user may enter or select "Custom" into entry box 1334. The customization unit 211 may store the entered information entered in the text area 1338 in memory and, when a user selects help for the respective operation, e.g., from the popup window 800, the customization unit 211 may access the identified help information and present it to the user on the display 120, e.g., in the tooltip window 1002, as indicated at block 1214. In the information box 1336 associated with the "Description" field 1330, the user may enter a short description of the operation being customized. The customization unit 211 may store the short description and cause it to be displayed, e.g., as the description 827, below the name of the operation in the popup window 800, as indicated at block 1216 (FIG. 12B). If the user chose the "Custom" option at entry box 1334, then in response to the selection of the information box 1338 associated with the "Help" field 1332, the customization unit 211 may present an information entry window (not shown). The user may enter, e.g., with the keyboard 116, custom-created help information for the operation. If the user chose an existing operation at entry box 1334, the user may still enter additional help information at entry box 1338. The customization unit 211 may store the help information in memory, and cause it to be displayed in a help window for the operation, e.g., the tooltip window 1002, as indicated at block 1218.

In the un-structured information entry area 1304, the user may enter one or more commands for execution by the technical computing environment 124. The customization unit 211 may store the commands in memory, as indicated at block 1220. In addition, when this operation is selected, e.g., from the popup window 800, by the user, the customization unit 211 may cause the technical computing environment 124 to execute the one or more commands that had been entered in the un-structured information entry area 1304, as also indicated at block 1220. For example, if the operation being customized through window 1300 is a plotting function that is executed by a command called 'plot' by the technical computing environment 124, then the user may enter this command in the un-structured information entry area 1304. The user may also direct the command to use the selected input data when performing this command, e.g., by calling the 'plot' function on the 'selected_matrix' input variable. Because the 'selected_matrix' variable has been assigned to the selected input data, this results in the operation being performed on the selected input data. In sum, the un-structured information entry area 1304 is where the user may specify the action or actions that are taken when the operation being customized is selected, e.g., from the popup window 800.

It should be understood that the user may enter a series of textual or graphical commands in the un-structured information entry area 1304. It should be further understood that the user may specify a program, such as an m-file, to be executed.

The customization interface 1300 also may include an OK button 1340, a Run button 1342 and a Cancel button 1344. In response to the user selecting the Run button 1342, the customization unit 211 directs the evaluation unit 206 to determine whether the selected input data satisfies the input argument constraints as provided at combo box 1310, as indicated at block 1222. The customization unit 211 may also direct the action unit 202 to perform the one or more actions specified in the unstructured area 1304, as also indicated at block 1222. If the evaluation of the selected input data and performance of the action proceed as desired, the user may select the OK button 1340. In response, the customization unit 211 may save the information entered at the customization user interface 1300 in memory, and close the customization user interface 1300. If the matching operation or the action does not operate as expected or desired, the user may make changes to the information presented by the customization user interface 1300 before selecting the OK button 1340. In response to the user selecting the Cancel button 1344, the customization unit 211 may close the customization user interface 1300 without saving any of the changes that may have been made thereto.

The customized interface 1400 illustrated in FIGS. 14 and 15, which represents advanced mode, similarly includes a structured area 1402 and an un-structured area 1404. As with the window 1300 illustrated in FIG. 13 for the default mode, the structured area 1402 has a "Display conditions" group 1406 having an entry 1408. Rather than present a drop down list of input argument constraints for selection by the user, the user may write programming code that specifies the input argument constraints for the operation being customized through interface 1400. In an embodiment, when the user selects entry 1408, the customization unit 211 may present a code entry window. FIG. 15 is an illustration of the customized interface 1400 with a code entry window 1502. Programming code, such as one or more textual commands, may be entered in the code entry window 1502 by the user, e.g., with the keyboard 116 and/or mouse 118. The programming code may return a Boolean, e.g., True or False. The customization unit 211 may store the programming code entered by the user in the user-specified conditions 210, as indicated at block 1224. Accordingly, when input data 204 is selected, the evaluator 206 will run the programming code entered by the user in the code entry window 1502, which may be stored in the user-specified conditions 210, to determine whether the selected input data 204 matches the input argument constraints for the corresponding operation. If the result is True, the operation matches the selected input data. If the result is False, the operations does not match the selected input data.

Figure 12C:
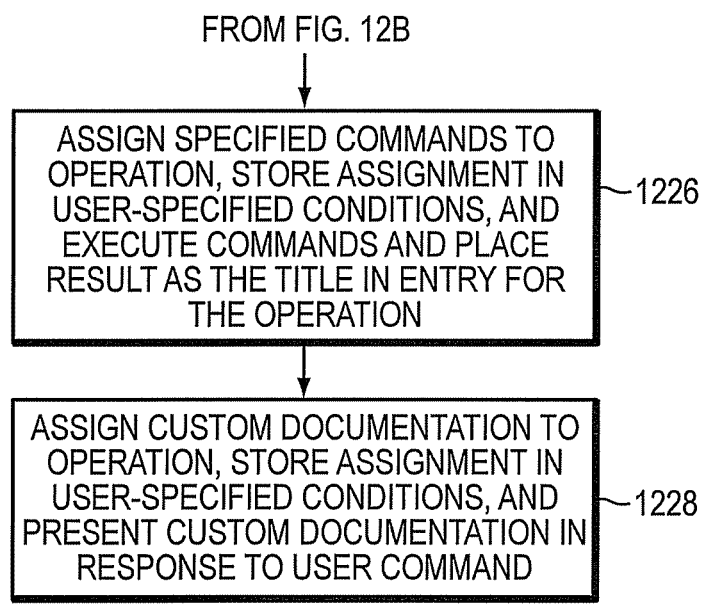

Referring back to FIG. 14, the customization user interface 1400 may include a 'Title and icons' group 1410 having a "Title" field 1412, a "Large icon" field 1414, and a "Small icon" field 1416, each with a corresponding information entry box 1418, 1420, 1422. In response to the user selecting the information entry box 1418 associated with the 'Title' field 1412, customization unit 211 may present a code entry window (not shown) for receiving one or more commands or programming statements. The customization unit 211 may store the commands or programming statements and, when the corresponding operation is presented in the popup window 800, execute these commands or programming statements and present the result as the title 825 of the operation, as indicated at block 1226 (FIG. 12C). For example, a user may enter commands such that the title for an operation is dependent upon the selected input data. For example, suppose the operation is a scatter plot function. The commands entered at information entry box 1418 may determine the form of the selected input data, such as two columns of data. The commands may further cause the title to be "Scatter plot for selected columns". The title used for an operation thus may change as a function of the type or form of selected input data.

A "Description and help" group 1424 may include a "Source" field 1426, a "Description" field 1428 and a "Help" field 1430, each with a corresponding information entry box 1432, 1434, and 1436. In the information entry box 1432 associated with the "Source" field 1426, the user may identify an operation from the technical computing environment 124 for which help information has already been created and exists, as described above. Alternatively, the user may choose to create custom documentation for the operation by selecting a "Custom" option. In response to the user entering custom-created documentation, e.g., at entry box 1436, the customization unit 211 may store the entered information in memory and, when a user selects help for the respective operation, e.g., from the popup window 800, the customization unit 211 may access the custom-created documentation and present it to the user on the display 120, e.g., in the tooltip window 1002, as indicated at block 1228. The information entry box 1434 also may operate as described above.

In the un-structured information entry area 1404, the user may enter one or more commands for execution by the technical computing environment 124. As described above, the customization unit 211 may store the commands in memory, and when this operation is selected, e.g., from the popup window 800, by the user, the customization unit 211 may cause the technical computing environment 124 to execute the one or more commands that had been entered in the un-structured information entry area 1304.

The customization user interface 1400 may also include an OK button 1440, a Run button 1442 and a Cancel button 1444, and upon selection of these buttons, the customization unit may respond as described above.

In an embodiment, selection of matching and non-matching operations may be implemented through a classification algorithm for each operation. The classification algorithms may be stored in a file executable by the technical computing environment, such as an m-file, which is executable by the MATLAB® product. The classification algorithms for each operation are evaluated on the selected input data, and the results, e.g., True or False, indicate whether the operations match or do not match the input data. The classification algorithm may be presented to the user in the form of a template as described above in connection with FIG. 14. Alternatively, the classification algorithm may be written by the user and thus range from simple criteria, such as checking the number of columns in a matrix of input data, to complex criteria, such as testing the numerical properties of a matrix.

It should be understood that the classification algorithm, which may be predefined or user-created for a given operation, may be independent of the operation's input argument constraints. That is, the classification algorithm may evaluate all or a part of the selected input data, irrespective of the input argument constraints of the operation, and return a True or False output, which as described above is used to determine whether the operation matches or does not match the selected input data. For example, a classification algorithm may evaluate whether all of the values of the selected input data are positive. Another classification algorithm may evaluate whether the selected input data represents two vectors of the same length. Yet another classification algorithm may evaluate whether the selected input data represents time. Those skilled in the art will understand that other classification algorithms may be defined.

Attached hereto as an Appendix is an example in m-code of classification algorithms used for plotting functions.

The customization unit, moreover, may allow the user to customize the appearance and labeling of operations, the classification algorithm for determining whether or not the operation matches selected input data, and the action that is performed, e.g., when the user selects the operation.

Referring to FIG. 13, a function command button 1350 may be provided on the customization user interface window 1300. The function command button 1350 may be provided near the un-structured area 1304. In response to the user selecting the function command button 1350, the technical computing environment 124 may present a function browser window on the display 120. A function command button 1450 (FIG. 14) may also be provided on the second customization user interface 1400.

Function Browser and Tooltip

Figure 16:
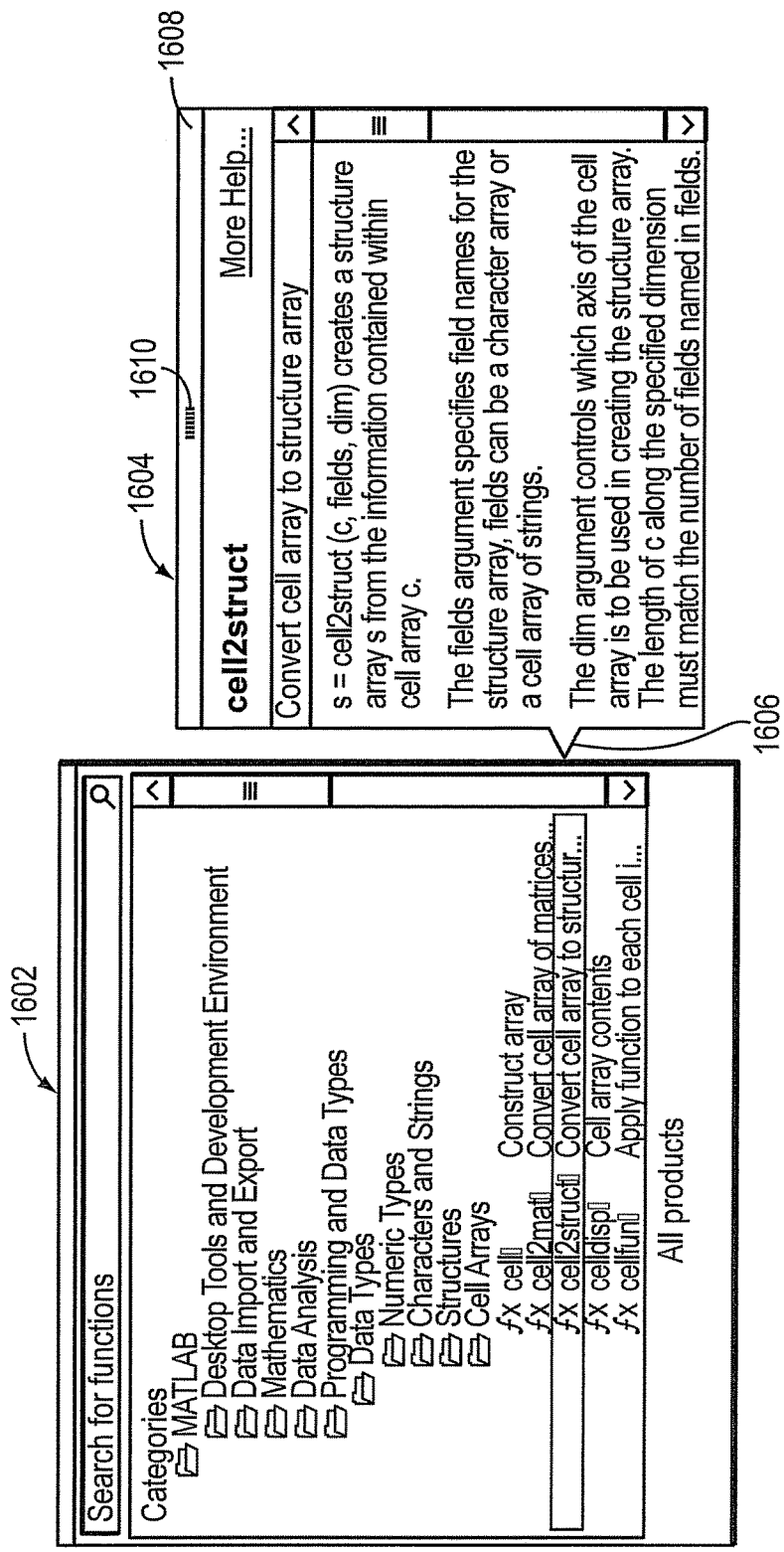

FIG. 16 is a schematic illustration of a user interface having a function browser window 1602 and a help window 1604. As indicated above, the function browser window 1602 may be generated by the technical computing environment 124 in response to the selection of the function command button 1350. The function browser window 1602 may present a hierarchically arranged list of functions provided by the technical computing environment 124. To obtain detailed information regarding a particular function, a user may select a Help command in association with a particular function. In an embodiment, a user may call-up a context window (not shown) for a selected function, e.g., by right-clicking the function. In response, the technical computing environment 124 may present a help window 1604 for the selected command. The help window 1604 may be displayed adjacent to the selected function, and may have an arrow 1606 that points to the selected function in the function browser window 1602, thereby associating the help window 1604 with the function.

The help window 1604 may also include a tear-off area 1608 having a tear-off button 1610. In response to the user selecting the tear-off button 1610, e.g., with the mouse 118, the technical computing environment 124 in cooperation with the operating system 122 may change the priority state of the help window 1604. Initially, e.g., before the selection of the tear-off command button 1610, the operating system 122 may assign a standard operating state to the help window 1604. Accordingly, if the user selects another window on the display 120 or otherwise transfers focus from the help window 1604 to another displayed window, the help window 1604 may be hidden behind the newly selected window. In response to the user selecting the tear-off command button 1610, the technical computing environment 124 and/or operating system 122 may change the state of the help window 1604 to a persistent state. While in this persistent state, the help window 1604 may remain on the top of the display 120, even though the user may select another window or transfer focus away from the help window 1604 to some other window. In addition, a user may "grab" the tear-off button 1610 and/or tear off area 1608, and drag the help window 1604 to a new location on the display 120.

It should be understood that fewer or other steps than those shown in flow diagrams may be performed, and that the order may be changed.

The foregoing description has been directed to specific embodiments of the present invention. It will be apparent, however, that other variations and modifications may be made to the described embodiments, with the attainment of some or all of their advantages. For example, other operations besides plotting functions may be evaluated, and other actions besides displaying, executing and generating programming code for matching and non-matching operations may be performed. Therefore, it is the object of the appended claims to cover all such variations and modifications as come within the true spirit and scope of the invention.

What is claimed is:

1. A method comprising:
for a plurality of operations, each operation defined to operate on one or more input arguments including one or more constraints,
receiving input data;
identifying, by a first processor, a first operation in which the input data satisfies the one or more constraints of the one or more input arguments of the first operation;
identifying, by the first or a second processor, a second operation in which the input data does not satisfy the one or more constraints of the one or more input arguments of the second operation;
presenting, on a display coupled to the first or the second processor, the first operation in a form selectable for execution by a user based on the input data satisfying the one or more constraints of the one or more input arguments of the first operation;
presenting on the display the second operation in a form that is non-selectable for execution by the user based on the input data not satisfying the one or more constraints of the one or more input arguments of the second operation;
executing, by the first, the second or a third processor, the first operation utilizing the input data; and
presenting a result of the executing of the first operation on the display.

2. The method of claim 1 further comprising:
presenting, on the display, in connection with the second operation help information indicating why the input data does not conform to the one or more constraints on the one or more input arguments of the second operation.

3. The method of claim 1 further comprising:
presenting, on the display, a help window associated with the second operation, the help window containing an indication of data that satisfies the one or more constraints on the one or more input arguments of the second operation.

4. The method of claim 1 wherein the plurality of operations includes plotting functions.

5. The method of claim 1 wherein
a group of operations from the plurality of operations is identified where the input data satisfies the one or more constraints on the one or more input arguments of each operation in the group of operations, and
at least one operation from the group of operations is presented on the display in a popup window.

6. The method of claim 5 further comprising:
presenting a result window on the display, the result window containing a result of the executing the first operation; and
maintaining, on the display, the popup window together with the result window.

7. The method of claim 5 wherein each operation in the group of operations appears as an entry in the popup window, the method further comprising:
presenting, on the display, a programming window; and
inserting, in the programming window, programming code for executing a given operation from the group of operations in response to the entry for the given operation being dragged from the popup window and dropped into the programming window, or in response to the entry for the given operation being copied from the popup window and pasted into the programming window.

8. The method of claim 5 wherein each operation in the group of operations is identified as a favorite operation by the user.

9. The method of claim 1 wherein the first and second operations are presented in a popup window, the method further comprising:
presenting, on the display, a programming window; and
receiving, in the programming window, programming code corresponding to the first operation or the second operation in response to the first operation or the second operation being dragged from the popup window and dropped into the programming window, or in response to the first operation or the second operation being copied from the popup window and pasted into the programming window.

10. The method of claim 9 wherein the
programming code for the first operation is executable, and
the programming code for the second operation requires editing to be executable.

11. The method of claim 1 wherein a group of operations from the plurality of operations is identified where the input data satisfies the one or more constraints on the one or more input arguments of each operation in the group of operations, and each operation of the group has at least one of a name, a description, and documentation, the method further comprising:
receiving from the user a search string; and
presenting on the display only those operations from the group of operations having the name, the description or the documentation that matches the search string from the user.

12. The method of claim 1 wherein a group of operations from the plurality of operations is identified where the input data does not satisfy the one or more constraints on the one or more input arguments of each operation in the group of operations, and each operation of the group has at least one of a name, a description, and documentation, the method further comprising:
receiving from the user a search string; and
presenting on the display only those operations from the group of operations having the name, the description or the documentation that matches the search string from the user.

13. The method of claim 1 wherein
the input data has a property, and
an appearance of the first operation as presented on the display depends on the property of the input data.

14. The method of claim 1 further comprising:
receiving, from the user, one or more condition statements for identifying whether the input data satisfies the one or more input argument constraints of the first operation.

15. The method of claim 1 further comprising:
receiving, from the user, one or more condition statements for customizing at least one of an icon, a description and documentation for the first or the second operation.

16. The method of claim 1 wherein the first operation has at least two input arguments, the method further comprising:
presenting on the display a label associated with the first operation, the label indicating a mapping of the input data to the at least two input arguments of the first operation.

17. The method of claim 16 further comprising:
presenting on the display a control icon associated with the first operation; and
altering, in response to the user selecting the control icon, the mapping of the input data to the at least two input arguments of the first operation.

18. The method of claim 1 wherein the input data is user-selected.

19. The method of claim 1 wherein the plurality of operations include one or more operations, functions, scripts and programs.

20. A system comprising:
a display; and
at least one processor configured to:
receive input data,
determine that the input data is compatible with a first data-dependent task,
display the first data-dependent task in an enabled for execution mode based on the input data being compatible with the first data-dependent task, and
display a second data-dependent task in a disabled for execution mode based on the input data not being compatible with the second data-dependent task.

21. A data processing device comprising:
a plurality of executable operations, each defined to produce one or more output arguments as one or more functions of one or more input arguments, at least one of the one or more input arguments having to meet an input argument constraint for the respective operation to execute;
a display; and
at least one processor, the at least one processor configured to:
receive input data,
identify a first operation having a first input argument constraint that is compatible with the input data,
identify a second operation having a second input argument constraint that is incompatible with the input data;
present, on the display, the first operation in a form selectable for execution by a user based on the input data being compatible with the first input argument constraint of the first operation,
present, on the display, the second operation in a form that is non-selectable for execution by the user based on the input data being incompatible with the second input argument constraint of the second operation, execute the first operation utilizing the input data, and
present a result of the executing of the first operation on the display.

22. The data processing device of claim 21 wherein the at least one processor is further configured to:
present, on the display, in connection with the second operation help information indicating why the one or more second input argument constraints of the second operation are incompatible with the input data.

23. The data processing device of claim 21 wherein the at least one processor is further configured to:
identify a group of operations from the plurality of executable operations wherein each operation of the group of operations has a particular input argument constraint that is compatible with the input data, and
present at least one operation from the group of operations on the display in a popup window.

24. The data processing device of claim 23 wherein each operation in the group of operations is identified as a favorite operation by the user.

25. The data processing device of claim 21 wherein the at least one processor is further configured to:
identify a group of operations from the plurality of executable operations having a particular input argument constraint that is compatible with the input data, each operation of the group having at least one of a name, a description, and documentation,
receive from the user a search string; and
present on the display only those operations from the group of operations having the name, the description or the documentation that matches the received search string.

26. A method comprising:
a plurality of operations, each operation defined to operate on one or more input arguments including one or more input argument constraints;

assigning a respective classification algorithm to a first operation and a second operation of the plurality of operations, wherein the classification algorithms output either true or false;
receiving data;
evaluating the classification algorithms utilizing the received data;
identifying, by a first processor, the first operation for which the assigned respective classification algorithm evaluates to true;
identifying, by the first or a second processor, the second operation for which the assigned respective classification algorithm evaluates to false;
presenting, on a display, the first operation in a form selectable for execution by a user based on the respective classification algorithm assigned to the first operation evaluating to true;
presenting, on the display, the second operation in a form that is non-selectable for execution by a user based on the respective classification algorithm assigned to the second operation evaluating to false;
executing, by the first, the second or a third processor, the first operation assigned the respective classification algorithm that evaluates to true utilizing the data; and
presenting a result of the executing of the first operation assigned the respective classification algorithm that evaluates to true on the display.

27. One or more non-transitory, computer-readable storage mediums with an executable program stored thereon, where the program instructs processing logic to:
 a plurality of executable operations, each operation defined to operate on one or more input arguments including one or more input argument constraints;
 receive a selection of input data;
 identify a first operation in which the input data satisfies the input argument constraint of the first operation;
 identify a second operation in which the input data a does not satisfy the input argument constraint of the second operation;
 present, on a display coupled to the processing logic, the first operation in a form selectable for execution by a user based on the input data satisfying the input argument constraint of the first operation;
 present, on the display coupled to the processing logic, the second operation in a form that is non-selectable for execution by the user based on the input data not satisfying the input argument constraint of the second operation;
 execute the first operation utilizing the input data, and
 present a result of the executing of the first operation on the display.

\* \* \* \* \*

UNITED STATES PATENT AND TRADEMARK OFFICE
CERTIFICATE OF CORRECTION

| | | |
|---|---|---|
| PATENT NO. | : 10,001,977 B1 | Page 1 of 3 |
| APPLICATION NO. | : 12/479585 | |
| DATED | : June 19, 2018 | |
| INVENTOR(S) | : James Gareth Owen et al. | |

It is certified that error appears in the above-identified patent and that said Letters Patent is hereby corrected as shown below:

In the Specification

Column 3, Line 7 reads:
"further be configured write to the computer readable"
Should read:
--further be configured to write to the computer readable--

In the Claims

Claim 2, Column 18, Line 20 reads:
"data does not conform to the one or more constraints on"
Should read:
--data does not conform to the one or more constraints of--

Claim 3, Column 18, Line 27 reads:
"straints on the one or more input arguments of the"
Should read:
--straints of the one or more input arguments of the--

Claim 5, Column 18, Line 34 reads:
"constraints on the one or more input arguments of each"
Should read:
--constraints of the one or more input arguments of each--

Claim 11, Column 19, Line 11 reads:
"data satisfies the one or more constraints on the one or more"
Should read:
--data satisfies the one or more constraints of the one or more--

Signed and Sealed this
Twenty-first Day of May, 2019

Andrei Iancu
*Director of the United States Patent and Trademark Office*

CERTIFICATE OF CORRECTION (continued)
U.S. Pat. No. 10,001,977 B1

Claim 12, Column 19, Line 23 reads:
"data does not satisfy the one or more constraints on the one"
Should read:
--data does not satisfy the one or more constraints of the one--

Claim 14, Column 19, Line 39 reads:
"or more input argument constraints of the first opera-"
Should read:
--or more constraints of the first opera- --

Claim 21, Column 20, Lines 8-13 read:
"a plurality of executable operations, each defined to produce one or more output arguments as one or more functions of one or more input arguments, at least one of the one or more input arguments having to meet an input argument constraint for the respective operation to execute;"
Should read:
--a plurality of operations, each defined to
operate on
one or more input arguments including
one or more
input argument constraints;--

Claim 22, Column 20, Lines 38-40 read:
"operation help information indicating why the one or more second input argument constraints of the second operation are incompatible with the input data."
Should read:
--operation help information indicating why the second input argument constraint of the second operation is incompatible with the input data.--

Claim 23, Column 20, Line 44 reads:
"executable operations wherein each operation of the"
Should read:
--operations wherein each operation of the--

Claim 25, Column 20, Line 55 reads:
"executable operations having a particular input argu-"
Should read:
--operations having a particular input argu- --

Claim 27, Column 22, Line 4 reads:
"a plurality of executable operations, each operation"

Should read:
--a plurality of operations, each operation--

Claim 27, Column 22, Lines 9-11 read:
"the input argument constraint of the first operation;
identify a second operation in which the input data a does
not satisfy the input argument constraint of the second"
Should read:
--the one or more input argument constraints of the first operation;
identify a second operation in which the input data does
not satisfy the one or more input argument constraints of the second--